United States Patent [19]

Sako et al.

[11] Patent Number: 5,189,646

[45] Date of Patent: Feb. 23, 1993

[54] SMALL-SIZED ELECTRONIC DEVICE WITH DEPTH GAUGE

[75] Inventors: Yukitoshi Sako; Fumitoshi Kamikawa; Sayuri Ohta, all of Suwa, Japan

[73] Assignee: Seiko Epson Corporation, Tokyo, Japan

[21] Appl. No.: 639,633

[22] Filed: Jan. 10, 1991

Related U.S. Application Data

[63] Continuation-in-part of Ser. No. 383,462, Jul. 20, 1989.

[30] Foreign Application Priority Data

| Jul. 20, 1988 | [JP] | Japan | 63-181091 |
| Aug. 18, 1988 | [JP] | Japan | 63-205534 |
| Aug. 18, 1988 | [JP] | Japan | 63-205538 |
| Aug. 19, 1988 | [JP] | Japan | 63-206977 |
| Aug. 19, 1988 | [JP] | Japan | 63-206978 |
| Jan. 10, 1990 | [JP] | Japan | 2-3209 |
| Sep. 13, 1990 | [JP] | Japan | 2-243375 |

[51] Int. Cl.[5] .................... G04B 47/06; G01L 7/00; G08B 21/00

[52] U.S. Cl. .......................... 368/10; 368/11; 73/290 R; 73/865.1; 340/870.16; 364/413.31

[58] Field of Search ............... 368/9, 10, 11; 73/290 R, 865.1, 866.3; 340/870.16; 364/413.31; 367/134

[56] References Cited

U.S. PATENT DOCUMENTS

| 3,958,108 | 5/1976 | Shimomura | 73/384 |
| 3,958,459 | 5/1976 | Shimomura | 73/384 |
| 4,086,580 | 4/1978 | Schroeder | 73/384 |
| 4,188,825 | 2/1980 | Farrar | 368/1 |
| 4,539,843 | 9/1985 | Wise . | |
| 4,563,758 | 1/1986 | Paternostro | 364/418 |
| 4,604,737 | 8/1986 | Hoffman | 364/413.31 |
| 4,611,923 | 9/1986 | Kawahara | 368/10 |
| 4,694,694 | 9/1987 | Vlakancic et al. | 368/11 |
| 4,782,338 | 11/1988 | Barshinger | 364/413.31 |
| 4,783,772 | 11/1988 | Umemoto et al. | 368/11 |
| 4,999,606 | 3/1991 | Comerford et al. | 340/525 |

FOREIGN PATENT DOCUMENTS 8300670 3/1983 European Pat. Off. .

OTHER PUBLICATIONS

Digitizing Oscilloscopes, Hewlett Packard Model No. 54502A.
Universal Counter, Hewlett Packard Model No. 5335A.
Loyst and Steidley, *Diving With Dive Computers*, pp. 49, 57, 75, 78 and 97.

*Primary Examiner*—Vit W. Miska
*Attorney, Agent, or Firm*—Blum Kaplan

[57] ABSTRACT

A small-sized electronic device with depth gauge includes a pressure sensor for measuring a present water pressure and outputting a pressure value. A memory stores the pressure data. A dive time measuring circuit measures a dive time interval. A mean depth calculator receives the pressure data and dive time interval and in response thereto outputs a mean depth value which is displayed on the device.

18 Claims, 17 Drawing Sheets

FIG. 4

REPETITIVE GROUP DESIGNATION

| DEPTH (FT.) | A | B | C | D | E | F | G | H | I | J | K | L | M | N | O |
|---|---|---|---|---|---|---|---|---|---|---|---|---|---|---|---|
| 10 | 60 | 120 | 210 | 300 | | | | | | | | | | | |
| 15 | 35 | 70 | 110 | 160 | 225 | 350 | | | | | | | | | |
| 20 | 25 | 50 | 75 | 100 | 135 | 180 | 240 | 325 | | | | | | | |
| 25 | 20 | 35 | 55 | 75 | 100 | 125 | 160 | 195 | 245 | 315 | | | | | |
| 30 | 15 | 30 | 45 | 60 | 75 | 95 | 120 | 145 | 170 | 205 | 250 | 310 | | | |
| 35 | 5 | 15 | 25 | 40 | 50 | 60 | 80 | 100 | 120 | 140 | 160 | 190 | 220 | 270 | 310 |
| 40 | 5 | 15 | 25 | 30 | 40 | 50 | 70 | 80 | 100 | 110 | 130 | 150 | 170 | 200 | |
| 50 | | 10 | 15 | 25 | 30 | 40 | 50 | 60 | 70 | 80 | 90 | 100 | | | |
| 60 | | 10 | 15 | 20 | 25 | 30 | 40 | 50 | 55 | 60 | | | | | |
| 70 | | 5 | 10 | 15 | 20 | 30 | 35 | 40 | 45 | 50 | | | | | |
| 80 | | 5 | 10 | 15 | 20 | 25 | 30 | 35 | 40 | | | | | | |
| 90 | | 5 | 10 | 12 | 15 | 20 | 25 | 30 | | | | | | | |
| 100 | | 5 | 7 | 10 | 15 | 20 | 22 | 25 | | | | | | | |
| 110 | | | 5 | 10 | 13 | 15 | 20 | | | | | | | | |
| 120 | | | 5 | 10 | 12 | 15 | | | | | | | | | |
| 130 | | | 5 | 8 | 10 | | | | | | | | | | |
| 140 | | | 5 | 7 | 10 | | | | | | | | | | |
| 150 | | | 5 | | | | | | | | | | | | |
| 160 | | | | 5 | | | | | | | | | | | |
| 170 | | | | 5 | | | | | | | | | | | |
| 180 | | | | 5 | | | | | | | | | | | |
| 190 | | | | 5 | | | | | | | | | | | |

DIVING TIME (MIN.)

FIG. 5

| Repetitive Group Designation | | | | | | | | | | | | | | | | | Re-diving Depth (ft.) |
|---|---|---|---|---|---|---|---|---|---|---|---|---|---|---|---|---|---|
| A | B | C | D | E | F | G | H | I | J | K | L | M | N | O | Z | |
| 7 | 17 | 25 | 37 | 49 | 61 | 73 | 87 | 101 | 116 | 138 | 161 | 187 | 213 | 241 | 257 | 40 |
| 6 | 13 | 21 | 29 | 38 | 47 | 56 | 66 | 76 | 87 | 99 | 111 | 124 | 142 | 160 | 169 | 50 |
| 5 | 11 | 17 | 24 | 30 | 36 | 44 | 52 | 61 | 70 | 79 | 88 | 97 | 107 | 117 | 122 | 60 |
| 4 | 9 | 15 | 20 | 26 | 31 | 37 | 43 | 50 | 57 | 64 | 72 | 80 | 87 | 96 | 100 | 70 |
| 4 | 8 | 13 | 18 | 23 | 28 | 32 | 38 | 43 | 49 | 54 | 61 | 68 | 73 | 80 | 84 | 80 |
| 3 | 7 | 11 | 16 | 20 | 24 | 29 | 33 | 38 | 43 | 47 | 53 | 58 | 64 | 70 | 73 | 90 |
| 3 | 7 | 10 | 14 | 18 | 22 | 26 | 30 | 34 | 38 | 43 | 48 | 52 | 57 | 62 | 64 | 100 |
| 3 | 6 | 10 | 13 | 16 | 20 | 24 | 27 | 31 | 34 | 38 | 42 | 47 | 51 | 55 | 57 | 110 |
| 3 | 6 | 9 | 12 | 15 | 18 | 21 | 25 | 28 | 32 | 35 | 39 | 43 | 46 | 50 | 52 | 120 |
| 2 | 5 | 8 | 11 | 13 | 16 | 19 | 22 | 25 | 28 | 31 | 35 | 38 | 40 | 44 | 46 | 130 |
| 2 | 5 | 7 | 10 | 12 | 15 | 18 | 20 | 23 | 26 | 29 | 32 | 35 | 38 | 40 | 42 | 140 |
| 2 | 4 | 7 | 9 | 11 | 14 | 17 | 19 | 22 | 24 | 27 | 29 | 31 | 33 | 36 | 37 | 150 |
| 2 | 4 | 6 | 9 | 10 | 13 | 16 | 18 | 20 | 23 | 26 | 28 | 29 | 31 | 34 | 35 | 160 |
| 2 | 4 | 6 | 8 | 10 | 12 | 14 | 17 | 19 | 22 | 24 | 26 | 27 | 29 | 31 | 32 | 170 |
| 2 | 4 | 6 | 8 | 10 | 12 | 14 | 16 | 18 | 20 | 22 | 25 | 26 | 28 | 30 | 32 | 180 |
| 2 | 4 | 6 | 8 | 10 | 11 | 13 | 15 | 17 | 19 | 21 | 24 | 26 | 28 | 30 | 31 | 190 |

Residual Nitrogen Time (min.)

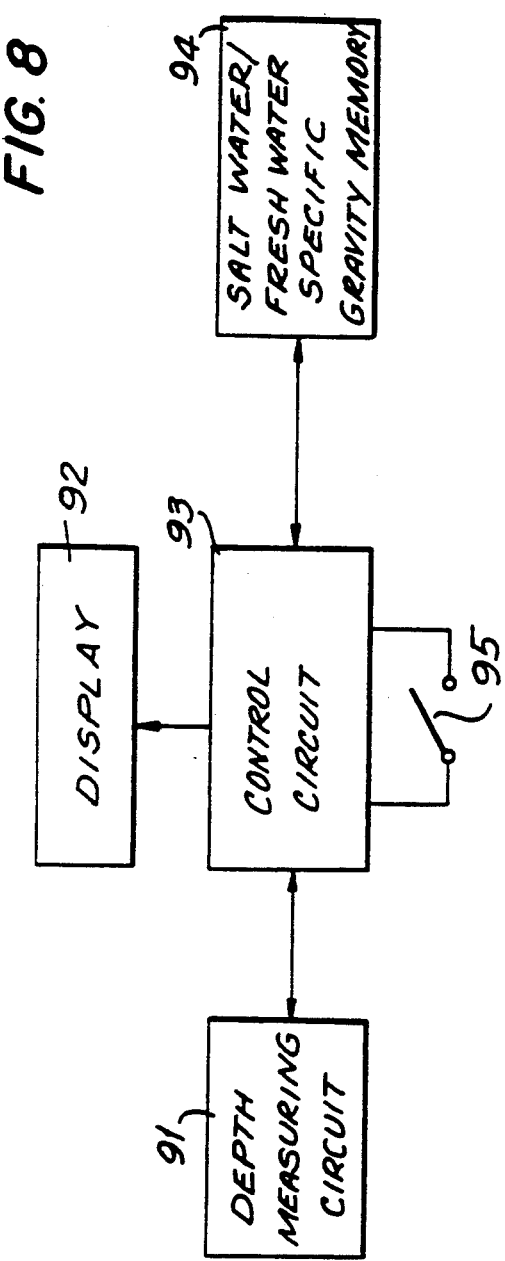
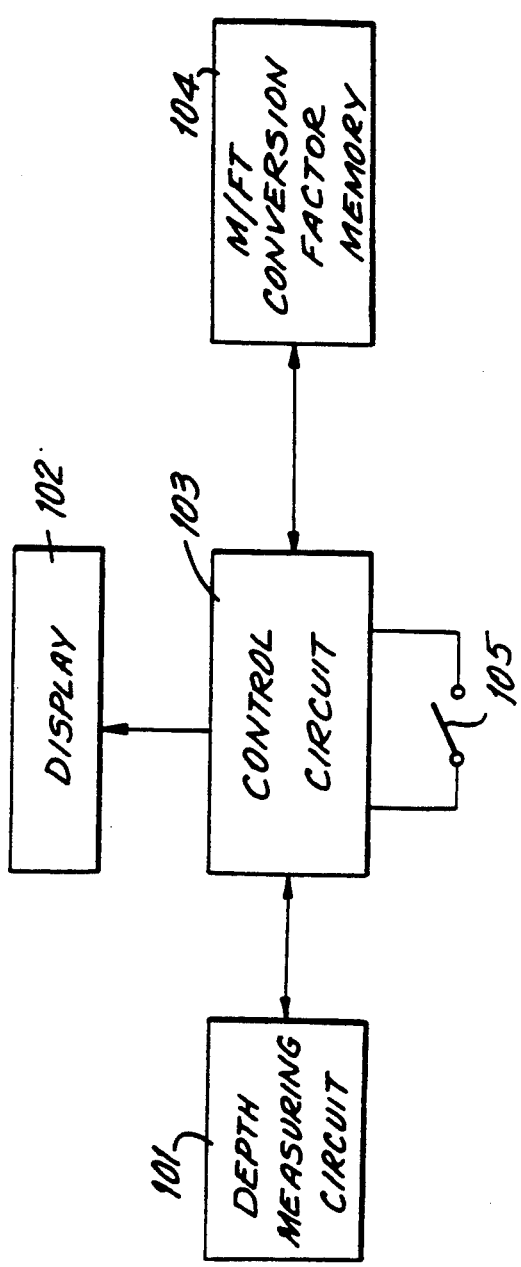

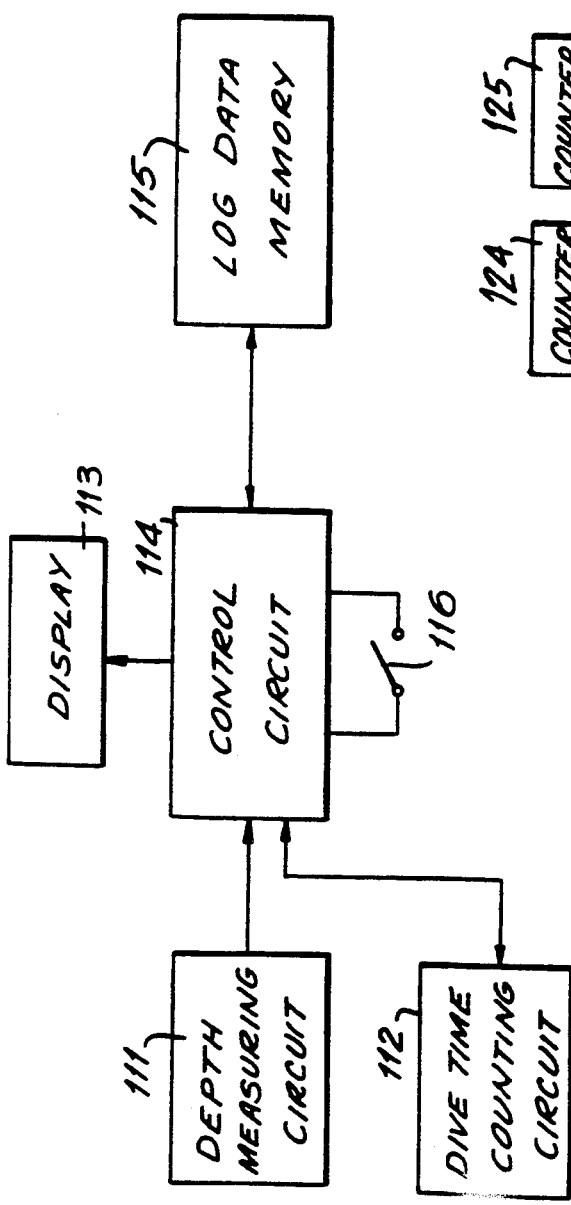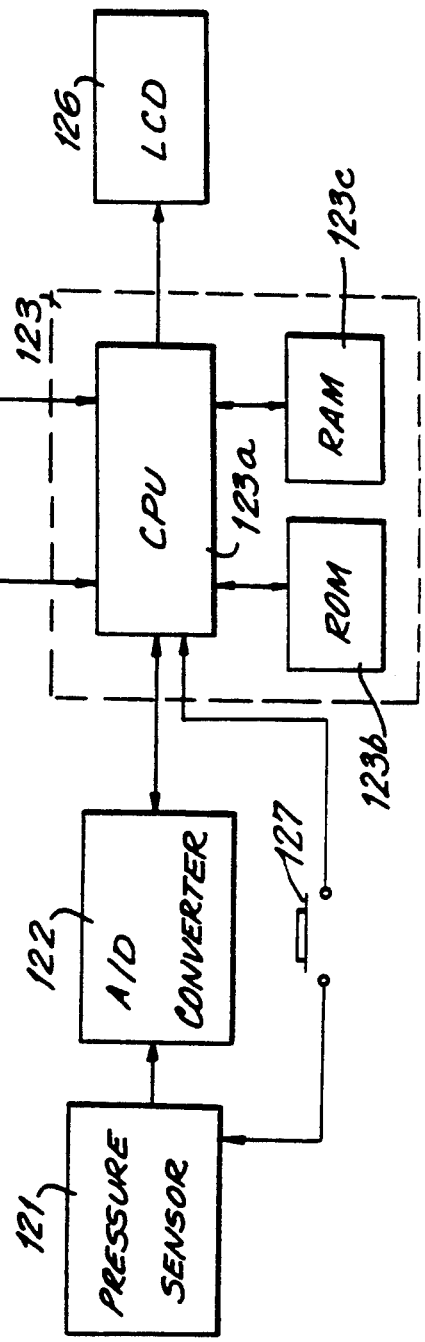
FIG. 10
FIG. 11A

FIG. 13

RESIDUAL NITROGEN TIMETABLE FOR REPETITIVE AIR DIVES

Repetitive Group at the Beginning of the Surface Interval

| | A | B | C | D | E | F | G | H | I | J | K | L | M | N | O |
|---|---|---|---|---|---|---|---|---|---|---|---|---|---|---|---|
| | 0:10<br>12:00* | 0:10<br>1:39 | 0:10<br>1:09 | 0:10<br>0:54 | 0:10<br>0:45 | 0:10<br>0:40 | 0:10<br>0:36 | 0:10<br>0:33 | 0:10<br>0:31 | 0:10<br>0:28 | 0:10<br>0:28 | 0:10<br>0:25 | 0:10<br>0:24 | 0:10<br>0:23 | 0:10<br>0:22 |
| | 2:11<br>12:00* | 1:10<br>2:38 | 0:55<br>1:57 | 0:46<br>1:29 | 0:41<br>1:15 | 0:37<br>1:06 | 0:34<br>0:59 | 0:32<br>0:54 | 0:29<br>0:49 | 0:27<br>0:45 | 0:26<br>0:42 | 0:25<br>0:39 | 0:24<br>0:36 | 0:23<br>0:34 | | 
| | 2:50<br>12:00* | 1:58<br>3:22 | 1:30<br>2:28 | 1:16<br>1:59 | 1:07<br>1:41 | 1:00<br>1:29 | 0:55<br>1:19 | 0:50<br>1:11 | 0:46<br>1:04 | 0:43<br>0:59 | 0:40<br>0:54 | 0:37<br>0:51 | 0:35<br>0:48 | | |
| | 5:49<br>12:00* | 2:29<br>3:57 | 2:00<br>2:58 | 1:42<br>2:23 | 1:30<br>2:02 | 1:20<br>1:47 | 1:12<br>1:35 | 1:05<br>1:25 | 1:00<br>1:18 | 0:55<br>1:11 | 0:52<br>1:07 | 0:49<br>1:02 | | | |
| | 6:33<br>12:00* | 2:59<br>4:25 | 2:24<br>3:20 | 2:05<br>2:44 | 1:48<br>2:20 | 1:36<br>2:03 | 1:26<br>1:49 | 1:19<br>1:39 | 1:12<br>1:30 | 1:08<br>1:24 | 1:03<br>1:18 | | | | |
| | 7:06<br>12:00* | 3:21<br>4:49 | 2:45<br>3:43 | 2:21<br>3:04 | 2:04<br>2:38 | 1:50<br>2:19 | 1:40<br>2:05 | 1:31<br>1:53 | 1:25<br>1:45 | 1:19<br>1:36 | | | | | |
| | 7:36<br>12:00* | 3:44<br>5:12 | 3:05<br>4:02 | 2:39<br>3:21 | 2:20<br>2:53 | 2:06<br>2:34 | 1:54<br>2:18 | 1:44<br>2:04 | 1:37<br>1:55 | | | | | | |
| | 8:00<br>12:00* | 4:03<br>5:40 | 3:22<br>4:19 | 2:54<br>3:36 | 2:35<br>3:08 | 2:19<br>2:47 | 2:05<br>2:29 | 1:56<br>2:17 | | | | | | | |
| | 8:22<br>12:00* | 4:20<br>5:48 | 3:37<br>4:35 | 3:09<br>3:52 | 2:48<br>3:22 | 2:30<br>2:59 | 2:18<br>2:42 | | | | | | | | |
| | 8:41<br>12:00* | 4:36<br>6:02 | 3:53<br>4:49 | 3:23<br>4:04 | 3:00<br>3:33 | 2:43<br>3:10 | | | | | | | | | |
| | 8:59<br>12:00* | 4:50<br>6:18 | 4:05<br>5:03 | 3:34<br>4:17 | 3:11<br>3:45 | | | | | | | | | | |
| | 9:13<br>12:00* | 5:04<br>6:32 | 4:18<br>5:16 | 3:46<br>4:29 | | | | | | | | | | | |
| | 9:29<br>12:00* | 5:17<br>6:44 | 4:30<br>5:27 | | | | | | | | | | | | |
| | 9:44<br>12:00* | 5:28<br>6:56 | | | | | | | | | | | | | |
| | 9:55<br>12:00* | | | | | | | | | | | | | | |
| | 10:06<br>12:00* | | | | | | | | | | | | | | |

NEW GROUP DESIGNATION: Z O N M L K J I H G F E D C B A

SURFACE INTERVAL

SMALL-SIZED ELECTRONIC DEVICE WITH DEPTH GAUGE

CROSS-REFERENCE TO RELATED APPLICATIONS

This is a Continuation-In-Part of pending U.S. patent application Ser. No. 07/383,462 filed Jul. 20, 1989.

BACKGROUND OF THE INVENTION

This invention relates to small-sized electronic devices having depth gauges, in particular, small-sized electronic devices having water depth measuring circuits and which are capable of determining a mean dive depth.

Modern divers dive utilize a variety of devices to ensure safety. One such device is a depth gauge. Small-sized electronic devices which include a depth gauge are known from Japanese Patent Application Laid-Open No. 62-21031 which discloses a scuba diver's watch having a semiconductor pressure sensor unit built within the watch casing. A device within the watch measures depth and counts dive time and displays this data to allow the diver to ascertain diving circumstances, thereby making safe diving possible. Although the conventional small-sized electronic device can measure dive depth and dive time, these two bits of information alone do not completely remove the danger of diver's paralysis, i.e. the "bends".

Over the millennia, human beings have physiologically adapted to normally operate within an environment of one atmosphere of pressure. Accordingly, there are no physiological problems when functioning at an altitude of approximately sea level, where an air pressure of approximately 1 atmosphere is present. However, when mountain climbing or travelling by air, difficulties are encountered caused by air pressure reduction. Similarly, if during scuba diving, the diver ascends too quickly, decompression occurs too quickly and the diver increases the danger of having the bends. This disease occurs if a diver having been subjected to a certain pressure experiences quick pressure reduction so that the equilibrium in pressure within the body of the diver and the environment no longer exists.

Some of these other devices provide more than water depth measurement and included functions for determining maximum water depth, dive time and provide a depth alarm and dive alarm if the dive went to deep or extended the dive for too long a period of time. However, it would still require the diver to predict air supply consumption and control depressurization on the basis of present physical conditions. Furthermore, the knowledge of the diver's physical condition is dependent on the diver's ability to rationally think and calculate based upon ratios of a mean water depth to air consumption and a function of dive time to air consumption. The prior art devices suffer from the disadvantage that they only provided displays of the present and maximum depth. The mean depth was determined based upon the sensibility, coherence and skills of the diver. Accordingly, due to human error, such a calculation is not always accurate leading to unsafe conditions.

Accordingly, it is desired to provide a small-sized electronic device having a depth gauge which overcome the disadvantages of the prior art devices described above by providing a continuous mean water depth display removing the danger of suffering the bends.

SUMMARY OF THE INVENTION

Generally speaking, in accordance with the present invention, a small-sized electronic device includes a pressure sensor which measures the current water pressure. The pressure sensor provides an output to an A/D converter which converts the data received from the pressure sensor into a digital pressure value. The pressure data received from the A/D converter is stored in a memory. A dive time measuring circuit measures the dive time interval. A mean depth calculator receives an input from the memory as well as the dive time measuring circuit and calculates a mean depth and provides an output to a display for displaying the mean depth.

In another embodiment the small-sized electronic device includes a control circuit. The control circuit receives input from a depth measuring circuit for measuring the current depth, a dive time interval counting circuit for counting the length of the current dive and a surface interval counting circuit for counting the surface time interval once the dive is completed. Based upon these inputs, the control circuit determines the current status of the diver. A decompression table memory containing non-decompression time limits is read by the control circuit during a first dive and a non-decompression time limit is displayed on a display in accordance with an output of the control circuit. A residual nitrogen time memory and a repetitive group designation instruction table memory are read by the control circuit during subsequent dives in accordance with data from the depth measuring circuit, dive time interval counting circuit and surface interval counting circuit.

A non-decompression time limit calculating circuit calculates a non-decompression profile in accordance with the data input by the depth measuring circuit, dive time interval counting circuit and surface interval counting circuit and read from the residual nitrogen time memory, repetitive group designation instruction table memory and decompression table memory and provides an output to the control circuit. The control circuit then outputs the non-decompression profile to the display to be displayed in a diver usable form. When the non-decompression time limits have been surpassed, a decompression management circuit in accordance with inputs from the decompression table memory provides an output to the control circuit to determine a decompression platform depth and time limit for safe ascension to the surface.

The small-sized electronic device may also be provided with an alarm which may either signal instructions to companion divers or signal to the user when the non-decompression limit has been exceeded. These alarms may be distinguishable from each other. A switch and resistor array is provided for changing the function of the device from depth measurement to altitude measurement. In another embodiment, the device may also be provided with a switch for setting the device for sea water determination and freshwater determination. In another embodiment, the device may also indicate an elapsed time timing function to determine the time interval remaining prior to safe plane travel after the last dive.

Accordingly, it is an object of the invention to provide an improved small-sized electronic device incorporating a depth gauge.

Another object of the invention is to provide a small-sized electronic device with depth gauge capable of providing additional important relevant information for determining the physical conditions of the diver, thereby making diving safer by calculating a mean depth based upon the values of dive time and a total water depth and displaying the mean depth.

It is another object of the invention to provide a small-sized electronic device having a depth gauge which allows the improvement in diving skills to be known from observing the mean water depth value, the dive time and the air consumption for each dive.

A further object of the invention is to provide a small-sized electronic device with a depth gauge which utilizes a method of detecting the mean depth based upon the use of a sampling method, thereby by reducing operation time which in turn conserves the amount of electricity consumed.

Still another object of the invention is to provide a small-sized electronic device with depth gauge in which it is not necessary to continuously store water depth in a RAM, but to recalculate the water depth for each water pressure measurement based upon the mean depth and dive time, thus enabling a reduction in RAM capacity.

Yet another object of the invention is to provide a small-sized electronic device with a depth gauge which displays a non-decompression time limit for each discrete diving depth and provides decompression instructions based on decompression tables when a diver dives for an interval in excess of a non-decompression time limit.

Still other objects and advantages of the invention will in part be obvious and will in part be apparent from the specification.

The invention accordingly comprises the features of construction, combinations of elements, and arrangement of parts which will be exemplified in the constructions hereinafter set forth and the scope of the invention will be indicated in the claims.

BRIEF DESCRIPTION OF THE DRAWINGS

For a fuller understanding of the invention, reference is had to the following description taken in connection with the accompanying drawings, in which:

FIG. 4 is a diagram of the repetitive group designation;

FIG. 5 is a diagram of residual nitrogen times;

FIG. 8 is a block diagram of a saltwater/freshwater measurement circuit constructed in accordance with the invention;

FIG. 9 is a block diagram of a foot/metric converter circuit constructed in accordance with the invention;

FIG. 10 is a block diagram of a log data storage circuit constructed in accordance with the invention;

FIG. 11A is a block diagram of a flight time indicator constructed in accordance with the invention;

FIG. 13 is a residual nitrogen timetable for use in accordance with the invention;

DETAILED DESCRIPTION OF THE PREFERRED EMBODIMENTS

Figure 1:
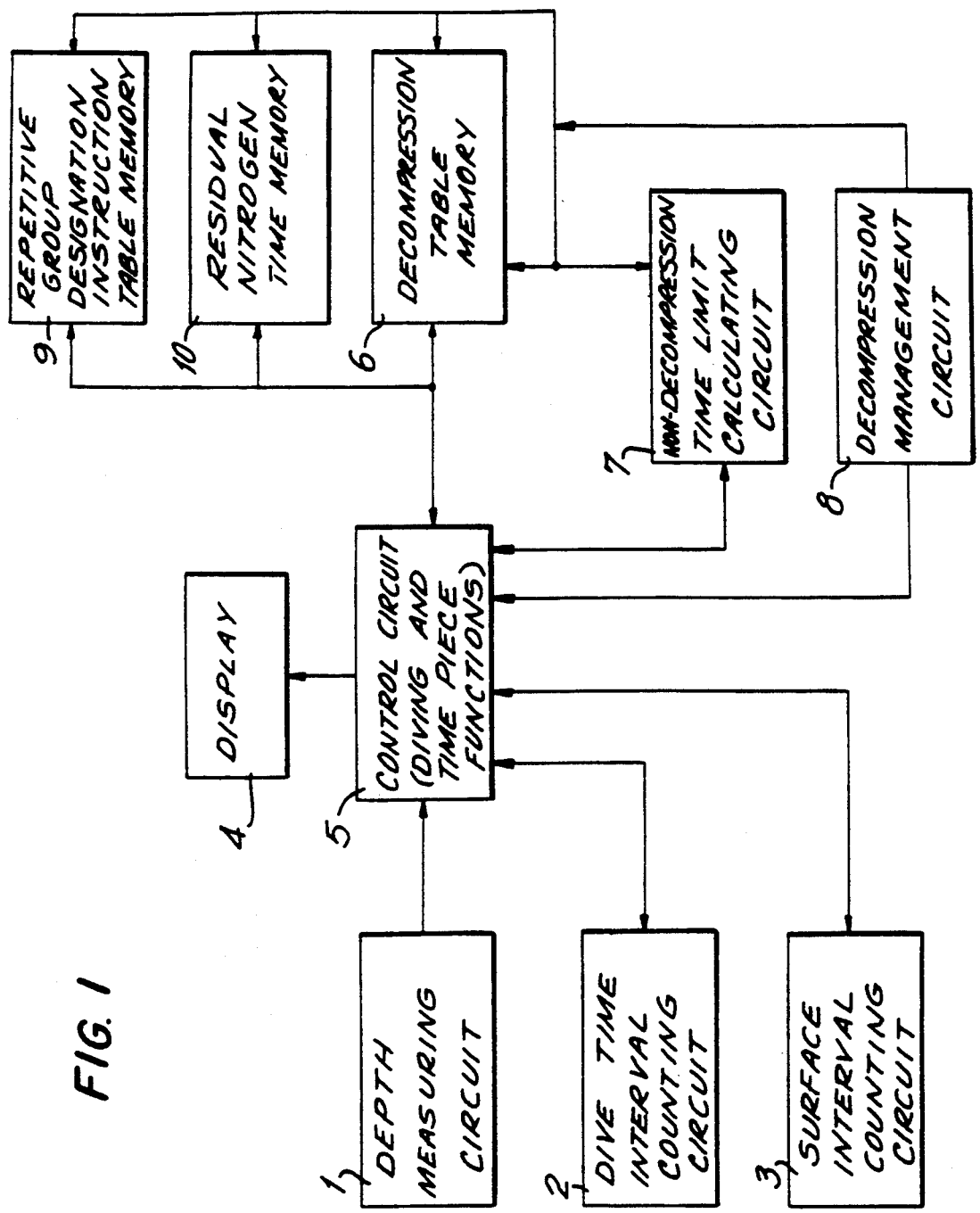
FIG. 1 is a simplified block diagram of a small-sized electronic device having a depth gauge constructed in accordance with the invention.

Reference is now made FIG. 1 in which a block diagram of a small-sized electronic device having a depth gauge, generally indicated at 100 is provided. Generally speaking, in accordance with the present invention, a small-sized electronic device includes a control circuit 5. Control circuit 5 receives input from a depth measuring circuit 1 for measuring the current depth, a dive time interval counting circuit 2 for counting the length of the current dive and a surface interval counting circuit 3 for counting the surface time interval once the dive is completed. Based upon these inputs, control circuit 5 determines the current status of the diver. A decompression table memory 6 containing non-decompression time limits is read by control circuit 5 during a first dive and a non-decompression time limit is displayed on a display 4 in accordance with an output of the control circuit.

For repetitive dives a residual nitrogen time memory 10 and a repetitive group designation instruction table memory 9 are read by control circuit 5 during subsequent dives in accordance with data from the depth measuring circuit 1, dive time interval counting circuit 2 and surface interval counting circuit 3. A non-decompression time limit calculating circuit 7 calculates a non-decompression dive profile in accordance with the data input by depth measuring circuit 1, dive time interval counting circuit 2 and surface interval counting circuit 3, residual nitrogen time memory 10, repetitive group designation instruction table memory 4 and decompression table memory 6 and provides an output to control circuit 5. Control circuit 5 then outputs the non-decompression profile to display 4 to be displayed in a diver usable form. When the non-decompression time limits have been surpassed, a decompression management circuit 8 in accordance with inputs from decompression table memory 6 provides an output to control circuit 5 to determine a decompression platform depth and time limit for safe ascension to the surface.

Figure 2:
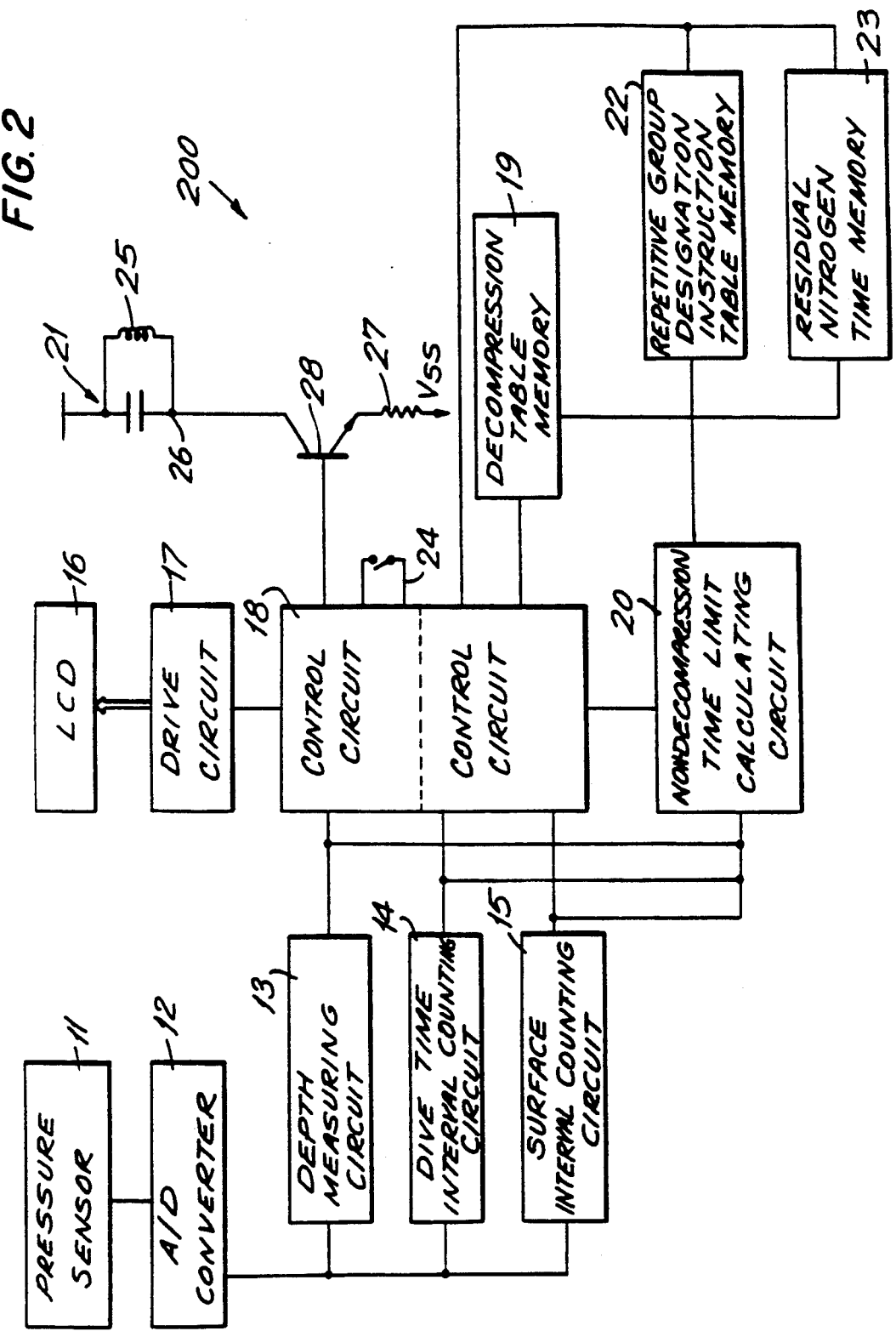
FIG. 2 is a block diagram of one embodiment of the small-sized electronic device with a depth gauge in accordance with the invention.

Reference is now made to FIG. 2 in which a block diagram of a more specific embodiment, generally indicated at 200, includes a diaphragm-type semiconductor pressure sensor 11 which outputs an electric analog signal corresponding to a depth measured. An A/D converter 12 converts the signal output by pressure sensor 11 into a digital value. Depth measuring circuit 13 receives the digital output of A/D converter 12 and provides an output to a control circuit 18. Control circuit 18 causes a drive circuit 17 to drive an LCD 16 to display the depth output by depth measuring circuit 13. Control circuit 18 receives a dive time interval input from a dive time interval counting circuit 14. A surface interval counting circuit 15 also provides an input to control circuit 18. Based on the input of dive time interval counting circuit 14, control circuit 18 causes drive circuit 17 to drive LCD 16 to display a dive time interval when also displaying the depth measured. When pressure sensor 11 senses a surface pressure, control circuit 18 causes LCD 16 to display a surface interval time in accordance with an output of surface interval counting circuit 15.

During a first dive, the non-decompression dive profile is to be displayed. Calculating circuit 20, in response to an input from depth measuring circuit 13, reads decompression data from a decompression table stored in a decompression table memory 19. Calculating circuit 20 provides a non-decompression dive profile output corresponding to non-decompression time limits at each dive depth to control circuit 18 which causes the non-decompression dive profile to be displayed.

In second and subsequent repetitive dives, a non-decompression dive profile for subsequent diving is obtained based upon the dive depths (maximum depths obtained during previous dives), dive time intervals and surface interval times of the preceding dives as determined from depth measuring circuit 13, dive time interval counting circuit 14 and surface interval counting circuit 15. A non-decompression dive profile for subsequent diving is obtained by determining a repetitive group designation using a repetitive group designation instruction table memory 22. A residual nitrogen value is calculated utilizing data from residual nitrogen time memory 23. The residual nitrogen time value is subtracted from a non-decompression time limit calculated in determining the non-decompression dive profile. Control circuit 18 causes LCD 16 to display the newly calculated time value to bring the non-decompression time limit to the attention of the diver.

When the diver dives for a time interval in excess of a non-decompression time limit, the diver experiences greater risk of experiencing the bends if he swims directly to the surface. Accordingly, depending on the diving circumstances, when the non-decompression time limit is exceeded control circuit 18 reads a decompression table stored in a decompression table memory 19 to ascertain a decompression stop depth and a decompression time interval dependent on the need for decompression. The decompression stop depth and decompression time interval are displayed on LCD 16 to allow the diver to manage decompression to avoid the bends.

If the display of LCD 16 is insufficient to alert the diver, then an alarm 21 is provided to notify the diver through the use of sound to ensure safer diving. Alarm 21 includes an inductor 25 in parallel with a capacitor 26. The emitting-collection path of transistor 28 is coupled between capacitor 26 and $V_{SS}$ with its base coupled to control circuit 18, so that the emitter is coupled to $V_{SS}$ across a resistor 27. A switch 24 is provided on control circuit 18 to activate control circuit 18.

Figure 3:
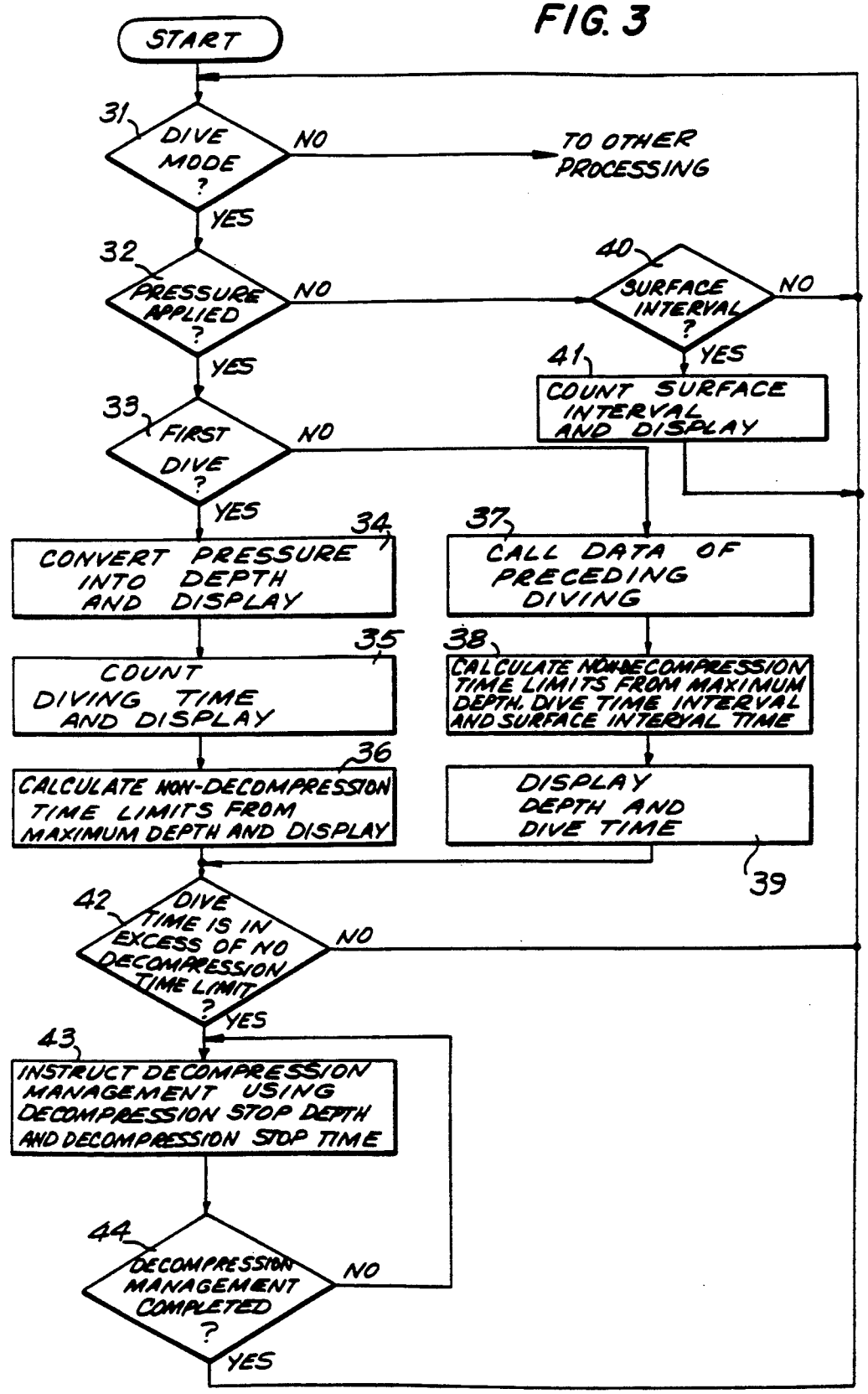
FIG. 3 is a flow chart showing the operation of the small-sized electronic device.

Reference is now made to FIG. 3 in which a flow chart for operating the small-sized electronic device having a depth gauge is provided. It is first determined whether the device is in a dive mode in a step 31. If the device is not in a dive mode, then other non-dive processing is carried out. If the device is in the dive mode, pressure sensor 11 is energized, the initial depth is reset to zero and a pressure is applied to pressure sensor 11 in a step 32 to determine whether an output results in response to the pressure applied. When an output is delivered from sensor 11, it is then determined whether this is the first dive in accordance with a step 33. If it is determined that this is the first dive, the pressure sensed by pressure sensor 11 is converted into a depth by depth measuring circuit 13 and displayed on LCD 16 in a step 34. The dive time interval is counted by dive time interval counting circuit 14 and a dive time interval is displayed on LCD 16 in a step 35. Calculating circuit 20 calculates non-decompression time limits from the maximum dive depth, calculates a dive profile and causes a non-decompression time limit to be displayed on LCD 16 in a step 36.

If it is determined in step 33 that this is not a first dive, but an intermediate dive in a continuous dive program, the maximum depth data, dive time data and surface interval data of the preceding dives are recalled in a step 37. Calculating circuit 20 calculates non-decompression time limits from the recalled data in a step 38. The dive depth and dive time are displayed on LCD 16 in a step 39.

In this condition as the button is depressed to input, the depth is changed by increments shown in FIG. 4 or a proper time, so that a non-decompression time limit in accordance with the depth is calculated and is displayed. In both the first dive and subsequent repetitive dives, it is then determined whether the actual dive time is in excess of the calculated non-decompression time limits in a step 42. Where the time limit is exceeded, control circuit 18 causes LCD 16 to display a decompression stop depth and a decompression time interval in a step 43. It is then determined whether decompression management has been completed in a step 44. If decompression management has not been completed then step 43 is repeated until decompression management has been completed, i.e. the diver may ascend to the surface without suffering from the bends.

If in step 32 it is determined that no pressure greater than one atmosphere is being applied, then it is determined that the diver is at the surface. It is then determined whether this is a surface interval state in a step 40. If it is a surface interval state, then the surface interval is counted and displayed on LCD 16 in a step 41. Utilizing the above process, small-sized electronic device 200 is able to display non-decompression time limits and decompression management information.

Even if the mode is not the diving mode, if the electronic device displays the data shown in FIG. 4 in accordance with activation of a button and the depth is incrementally changed the non-decompression time limit is calculated and displayed in accordance with the depth. For example, at an initial starting time, the depth is 3.5 feet, 310 minutes is displayed as the diving time. If depth is 40 feet a 220 minute dive time is displayed. In repetitive dives, the next dive time is planned by using the new diving groups corresponding to the surface interval as shown in FIG. 13. For example, if the depth is 40 and 183 minutes are displayed, the surface interval is 0:10 to 2:10 repetitive dive group B. If the depth is 40 feet for 193 minute dive time the surface interval is 2:11 to 12:00 corresponding to a repetitive dive group A.

Reference is now made to FIG. 4 in which repetitive dive group designations are provided. Repetitive dive group designations are determined as a function of dive depth and dive time.

Reference is now made to FIG. 5 in which a diagram showing residual nitrogen times is provided. Residual nitrogen time is presented in minutes corresponding to each repetitive dive depth and is obtained on the basis of the repetitive group designation obtained in FIG. 4 and the repetitive dive depth in feet.

Utilizing a small-sized electronic device as described above, non-decompression time limits for a non-decompression dive profile is automatically calculated based upon the maximum dive depth, dive time and surface interval time of preceding dives. Therefore, contrary to the prior art, the diver does not have to rely on his experience and intuition to prevent the bends and it is no longer necessary to consult decompression tables and calculate non-decompression time limits or remember such time limits during each dive. Therefore, trouble is avoided during the dive, even if the diver forgets the non-decompression time limits the device may be consulted on a regular basis, further removing the need to read the dive tables during a dive, further insuring safe diving.

Where the diver dives for a time interval in excess of non-decompression time limits, the timing function of the present device displays a decompression stop depth and decompression time interval to prevent the diver from succumbing to the bends. This device allows the diver to manage his decompression which is beneficial to the safety of various industrial divers as well as recreational divers.

The data in the decompression table which is utilized during decompression management differs from country to country. Accordingly, the contents of the decompression table must be changed, depending on the country in which they are used. Further, the decompression table is merely representative, therefore for fat divers, women divers or physically weaker divers, it is preferable to incorporate a function for correcting the values of the decompression table to allow for a larger margin of safety in consideration of a diver's physical strength and/or to correspond with the diver's physical condition.

Figure 6A:
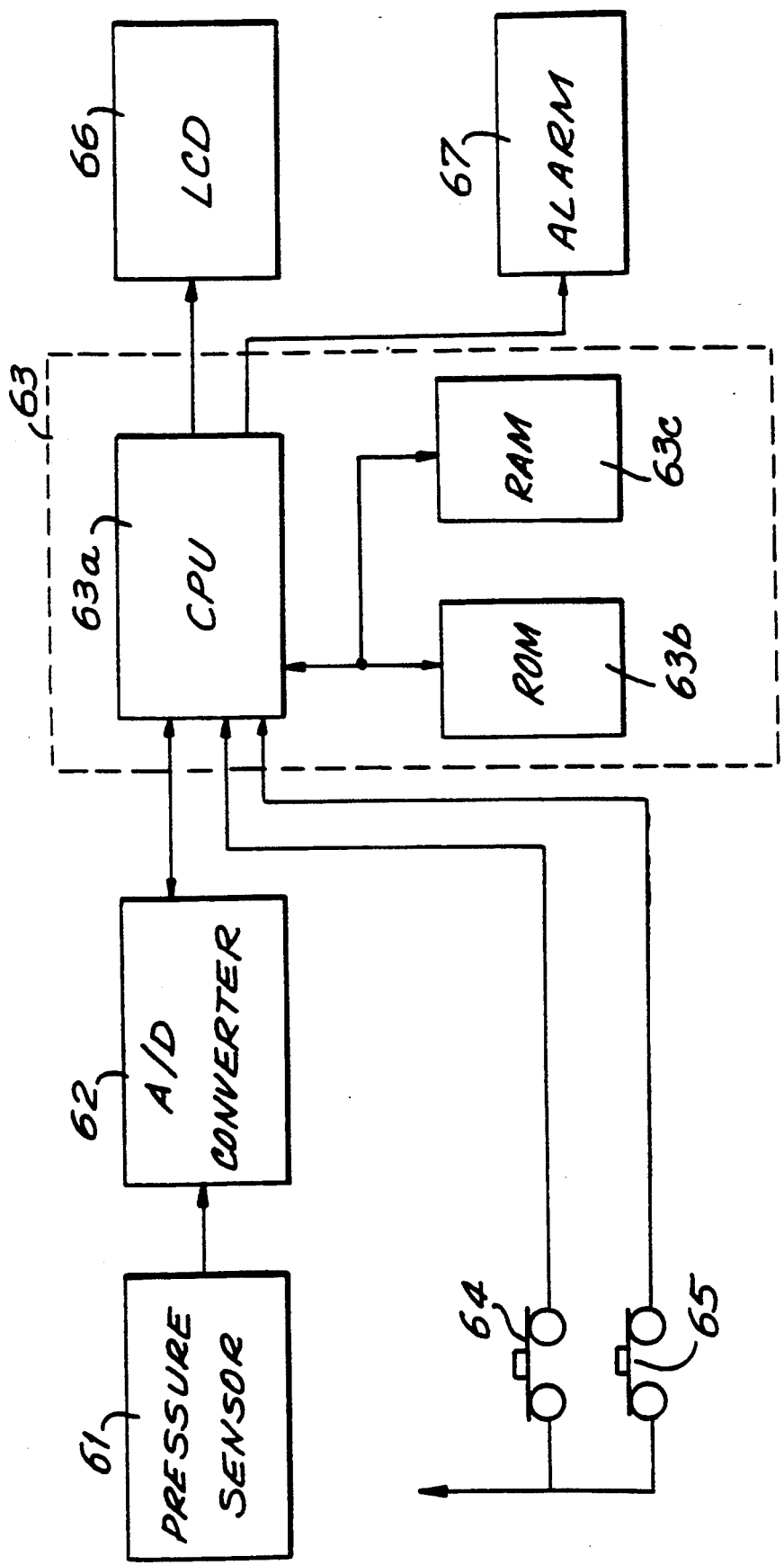
FIG. 6A is a block diagram for an alarm generator constructed in accordance with the invention.

Reference is now made to FIG. 6A which is a block diagram for a sound generator to be incorporated with the small-sized electronic device. A diaphragm-type semiconductor pressure sensor 61 produces a signal corresponding to pressure at each depth. An A/D converter 62 receives the pressure signal and converts the analog depth signal into a digital value. A CPU 63a controls A/D converter 62 and receives the digital pressure value produced by A/D converter 62 and converts it into depth data. CPU 63a is part of a microcomputer 63 which includes CPU 63a, a ROM 63b and a RAM 63c which act as a memory for CPU 63a. ROM 63b contains program data for control of CPU 63a. In accordance with the programs stored in ROM 63b, CPU 63a controls the A/D converter 62 so that the digital pressure signal input to CPU 63a is received. CPU 63a transfers the converted depth data from A/D converter 62 to RAM 63c or transfers the depth data from RAM 63c to an LCD 66 if necessary.

CPU 63a also controls an alarm 67 to produce an output. A switch 64 determines the inputs to CPU 63a to select the sound pattern to be output by alarm 67. Specifically, when the signal of switch 64 is delivered to CPU 63a, one of a plurality of output patterns stored in ROM 63b is selected and input to CPU 63a which in turn provides an output to trigger alarm 67 in response to the output. A second switch 65 is an external input switch to CPU 63a. Specifically, when the signal from external input switch 65 is delivered to CPU 63a, the output pattern previously selected in accordance with the setting of switch 64 is output by CPU 63a to an alarm 67 so that an alarm sound is generated.

Figure 6B:
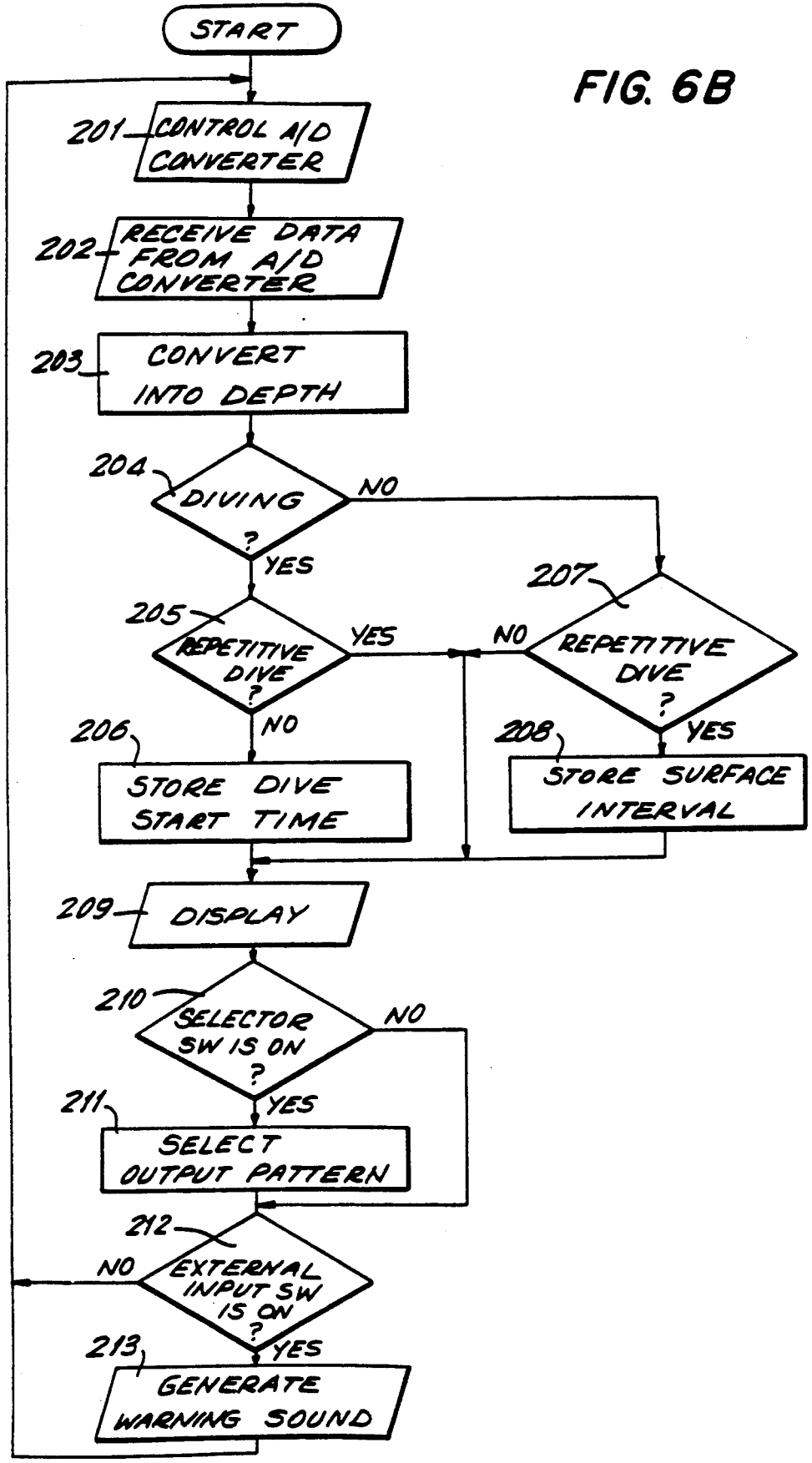
FIG. 6B is a flow chart for the operation of the alarm generator.

Reference is now made FIG. 6B in which a flow chart for generating the alarm sound is presented. A control signal is sent from CPU 63a to A/D converter 62 to begin processing of signals in a step 201. Digital pressure data is input to CPU 63a in a step 202. CPU 63a converts the digital pressure data into a depth value in a step 203. It is then determined based upon the depth value whether the diver is presently diving in a step 204. If the diver is presently diving it is determined whether or not this is a repetitive dive in a step 205. If this is not a repetitive dive then this dive is stored as a first dive and a dive starting time is stored in a step 206. If it is determined from the depth value that this diver is not diving in step 204 it is then determined whether or not repetitive diving has preceded the current pressure sensing in a step 207. Where preceding dives do exist it is determined whether a surface interval has begun and if a surface interval has begun then the surface interval is stored in a step 208. The depth data, dive start time and surface interval time are displayed as necessary in a step 209.

Warning sound pattern data (Table 1) is previously stored in ROM 63b and each pattern is given a particular meaning as desired for specific circumstances and users. For example, two short beeps would indicate to a diver and his dive partner to ascend to the surface. One long beep would indicate that there is danger in the vicinity of the dive partner.

TABLE 1

| No./Pattern | Output Width | Output Frequency | Contents |
|---|---|---|---|
| 1 | 125 msec | 4K | let's ascend |
| 2 | 125 msec | 4K | are you safe? |
| 3 | 125 msec | 4K | no air remains |
| 4 | 500 msec | 2K | your side is danger |
| 5 | 125 msec | 2K | come to this side |
| 6 To be assigned | . | . | . |
| 7 To be assigned | . | . | . |
| 8 To be assigned | . | . | . |
| 9 To be assigned | . | . | . |

TABLE 1-continued

| No./Pattern | Output Width | Output Frequency | Contents |
| --- | --- | --- | --- |
| 10 To be assigned | . | . | . |

To operate the alarm, it is determined whether switch 64 for selecting the warning sound pattern has been depressed in a step 210. Once it has been depressed a warning sound pattern is selected in a step 211. It is then determined whether the external input switch 65 for generating the warning sound has been depressed in a step 212. When switch 65 has been depressed the previously selected warning sound pattern is generated as the warning sound in a step 213.

Generally, when a diver desires to communicate with a dive partner during scuba diving, he must enter the field of vision of the dive partner to draw the dive partner's attention or touch the partner to draw a diver's attention because each diver is unable to speak without the aid of complex electronic communication systems. Practically, it becomes very difficult to get into the dive partner's field of vision, specially, in the case of fast currents where the diver can not move swiftly because the motion takes place underwater and thus, the communication between divers would be disabled in case of an emergency. On the other hand, in accordance with the present invention, a warning sound can be generated merely by controlling a switch kept by the diver's side. This removes the need to enter the dive partner's field of vision and make difficult maneuvers under water, facilitating transmitting one diver's thoughts with another.

In the prior art devices, when a diver's dive partner approaches a dangerous dive site, the diver must approach the dive partner and enter the partner's field of vision to draw the partner's attention. Then, he must communicate his thoughts through hand gestures. Utilizing an alarm as described above, various warning sound patterns are previously assigned individual meanings making such communication easier. For example, the signal "danger in your area" is previously assigned a warning sound pattern No. 4 corresponding to one long tone. When a dive partner approaches a dangerous area after the dive has begun, utilizing the control of a single switch another diver's thoughts can be transferred to a dive partner without having to go through the complex difficult operations involved with entering the dive partner's field of vision and communicating through hand gestures. Because each warning sound is assigned a particular meaning, the transfer of one diver's thought can be reliably obtained when compared with the use of hand gestures and the diver can be guided away from danger thus enjoying safe scuba diving, enhancing the effectiveness of the small-sized electronic device with depth gauge.

Figure 7:
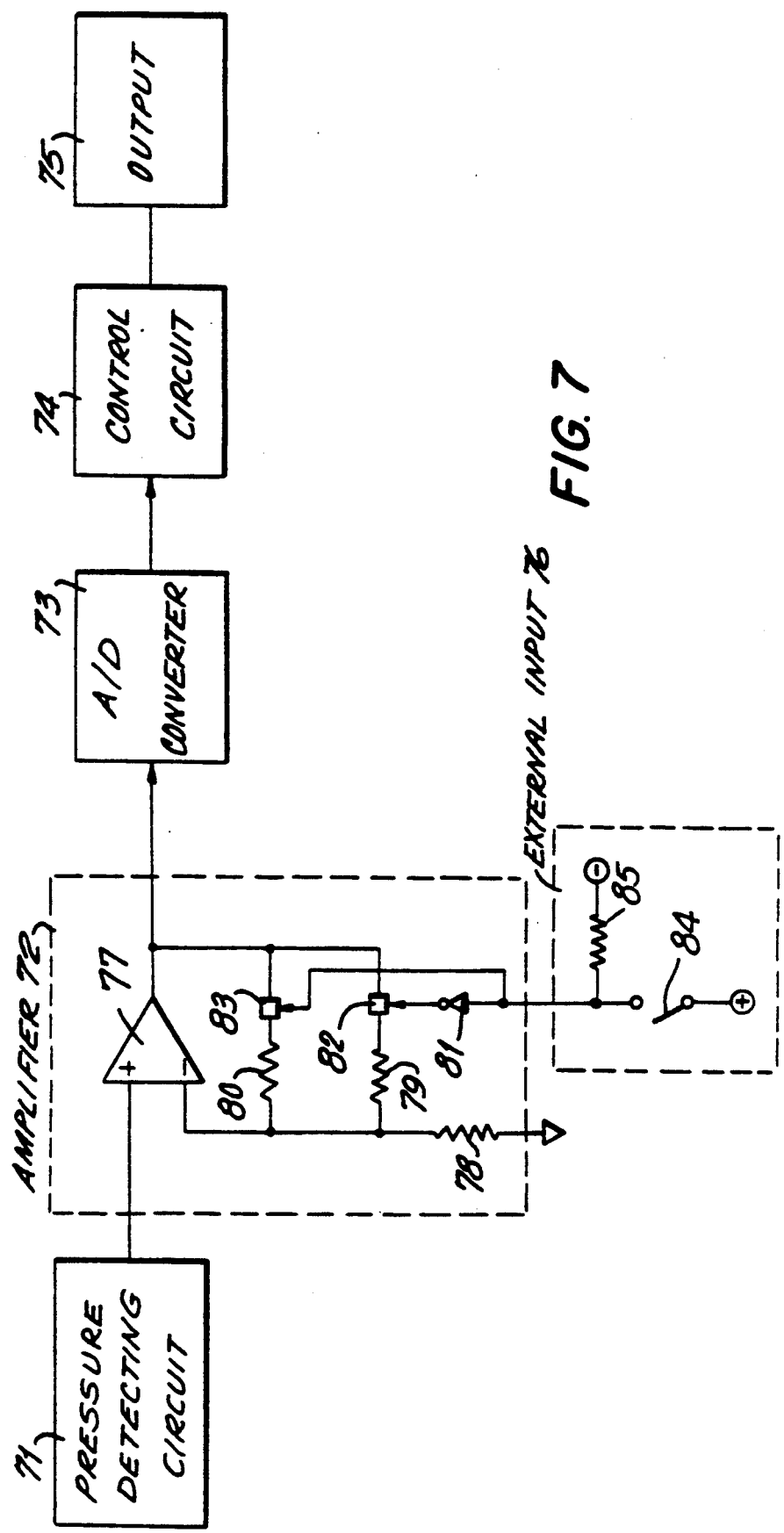
FIG. 7 is a block diagram of a depth/altitude measurement circuit constructed in accordance with the invention.

Reference is now made to FIG. 7 in which a block diagram showing an embodiment for depth measurement and altitude measurement in conjunction with a small-sized electronic device having a depth gauge is provided. A pressure detecting circuit 71 outputs an electric analog signal corresponding to a pressure being detected. This analog signal is applied to an amplifier 72. Amplifier 72 includes an operational amplifier 77, the positive input of which receives said analog signal. A resistor 80 is placed in series with a switch 83, the series connection being connected between the negative input and the output of operational amplifier 77. Additionally, a resistor 79 is in series with a switch 82, the series connection being also connected between the negative input and the output of operational amplifier 77. An external input is connected directly to switch 83 and through an inverter 81 to switch 82. A resistor 78 is positioned in series with the junction of resistors 79 and 80 and the negative input of operational amplifier 77.

The analog signal produced by pressure detecting circuit 71 is input to the positive input of operational amplifier 77. The amplification factor of operational amplifier 77 is determined by the resistance ratios between resistors 78, 79 and 80. External input 76 provides an input to amplifier 72 for selecting between an atmosphere measuring mode and depth measuring mode. Where depth is to be measured, a switch 84 of external input 76 is turned OFF. When switch 84 is OFF, the gate of switch 83 of amplifying means 72 receives a low input signal L through resistor 85 of external input 76. The gate of switch 82 is applied with a high signal H through invertor 81. As a result, only switch 82 is ON and the amplification factor of operational amplifier 77 becomes the ratio of resistor 79/resistor 78. On the other hand, when the altitude is to be measured, switch 84 of external input 76 is turned ON. With switch 84 being ON, the gate of switch 83 of amplifier 72 receives a high signal H and the gate of switch 82 receives a low signal L through an invertor 81. As a result only switch 83 is ON and the amplification factor of operational amplifier 77 becomes the ratio of resistance of resistor 80/resistor 78. It should be noted that the resistances of resistors 78–80 are selected so that the values of depth and altitude corresponding to water pressure and air pressure can be measured.

The analog signal produced by pressure detecting circuit 71 is amplified by amplifier 72 in accordance with the amplification factor selected by external input 76. The amplified signal is output to an A/D converter 73 which converts the analog signal into a digital signal and outputs this digital signal to a control circuit 74. Control circuit 74 performs a calculation on the input digital signal and outputs data to an output 75. Output 75 displays a depth value or altitude value in accordance with the data produced by control circuit 74.

The above described system may also be utilized when switching depth determination between seawater and freshwater environments which have different specific gravities. Although the above embodiment changes the amplification factor of the amplifier 72, the calculation method of control circuit 74 may also be changed. As described above, the external switch is used to change the amplification factor of the amplifier between depth measurement and altitude measurement so that air pressure which changes in response to altitude, which is a slight measurement when compared with measuring water pressure changing in accordance with depth, can be detected. Although the prior art uses distinct pressure sensors as pressure detectors to obtain depth measurement and altitude measurement, the present invention changes the amplification factor of the amplifying means so that both altitude and depth can be measured using a single pressure sensor. Because a single pressure sensor can now be used to measure both types of data, air pressure and water pressure, the electronic device can be miniaturized, reducing cost.

The conventional diver's watch having a depth gauge adapted for seawater produces outputs which must be converted when depth measurements are to be made in freshwater, because the specific gravity of freshwater and seawater differ so that the measured depth value differs between seawater and freshwater by a factor of the differences in specific gravity. However, in accordance with the above embodiment, the amplification factor of the amplifier may be changed through an external switch so that both measurements of saltwater and freshwater can be performed utilizing a single sensor.

Reference is now made to FIG. 8 in which an embodiment of a small-sized electronic device adaptable to both seawater and freshwater is provided. Diving environments are classified into two distinct types, seawater diving environments such as an ocean or a salt lake, and freshwater environments such as a lake or river. The small-sized electronic device of FIG. 8 includes a depth measuring circuit 91 and control circuit 93 for operating on the output of depth measuring circuit 91. Control circuit 93 includes an external input 95 shown as a switch which is set in either a saltwater mode or freshwater mode in accordance with the dive environment. During the dive, pressure data is output by depth measuring circuit 91 to control circuit 93. Control circuit 93, using this data and specific gravity data obtained from a saltwater/freshwater specific gravity memory 94, corrects the depth value output by depth measuring circuit 91 to determine an accurate depth. The corrected depth value is output to a display 92 so that the correct depth value is displayed in both saltwater and freshwater environments.

The above embodiment is adapted to determine depths in two kinds of specific gravity environments, saltwater and freshwater. However, where diving is to be conducted in a lake or other body of water having extremely different salt densities, it may be desirable that three or more types of specific gravity data be stored in saltwater/freshwater specific gravity memory 94.

Reference is made to FIG. 9 in which a block diagram for an embodiment in which the depth information is converted from feet to meters is provided. In the United States dive depth is expressed using the foot-yard system, while the majority of the other countries of the world utilize the metric system. Accordingly, to simplify construction, a small-sized electronic device having a depth gauge in which the output may be either in the form of feet or meters is shown. A depth measuring circuit 101 provides an output corresponding to a measured depth to a control circuit 103. Control circuit 103 causes the depth measured to be displayed on a display 102. An external input 105 is provided for selecting between a foot-yard operation of control circuit 103 and a metric operation. Prior to diving, the diver selects either the metric system or the foot-yard system through external input 105 which provides an input to control circuit 103. In accordance with the setting of external input 105, represented as a switch, control circuit 103 reads the appropriate conversion factor from a meter/foot conversion factor memory 104. For example, if switch 105 is set to cause control circuit 103 to display the depth in feet then control circuit 103 would read from meter foot conversion factor memory that 1 meter equals 3.2808 feet and display the depth in feet on display 102. This conversion between meters and feet can be carried out even during the dive.

In accordance with safe diving procedure, each diver maintains a dive log containing information corresponding to dive time and dive depth for each dive. Such information is utilized to maintain accurate records of prior dive histories to allow planning of future dive profiles. In a further embodiment of the invention, shown in FIG. 10 is a small-sized electronic device provided with a depth measuring circuit 111 and a dive time interval counting circuit 112 which provides dive depth and dive time information to a control circuit 114. Control circuit 114 causes this information to be stored in a log data memory 115. Control circuit 114 also causes the real clock time of descent, the time when ascent begins and surface interval time as well as the number of dives to be stored in log data memory 115. An external input shown as switch 116 is utilized to provide an input to control circuit 114 to cause control circuit 114 to display the various data stored in log data memory 115 on a display 113. The above embodiment of the small-sized electronic device allows the diver to know the dive data of the preceding dive so that he may plan the next dive profile as well as automatically maintaining an accurate log removing errors which are caused by transcribing information into a log book.

Reference is now made FIG. 11A in which an embodiment of the invention which provides an indication of whether the diver is able to fly is provided. A diaphragm type semiconductor pressure sensor 121 outputs an analog signal corresponding to pressures at each water depth. An A/D convertor 122 receives the analog pressure signal and converts it into a digital pressure value. A micro-computer 123 includes a CPU 123a, a ROM 123b and RAM 123c. CPU 123a controls A/D converter 122 and receives the digital pressure value output by A/D converter 122 and converts it into a depth value. Pressure sensor 121 and A/D converter 122 form a diving/surfacing signal. ROM 123b contains program data which is read by CPU 123a. CPU 123a acts in accordance with the program stored in ROM 123b and controls the A/D converter 122, receives the digital pressure value and transfers the data from A/D converter 122 to RAM 123c for storage or to an LCD 126 to display when necessary.

When the pressure value input by A/D converter 122 corresponds to a depth not equal to 0, CPU 123a determines that the diver is diving and causes a counter A 124 of a dive time interval counter to operate. The time counted by dive time interval counter A 124 is input to CPU 123a. When the depth value output by A/D converter 122 is 0, CPU 123a determines that the diver is at the surface and causes a counter B 125 of a surface interval counter to operate. The count produced by counter B 125 is also input to CPU 123a. A surface interval corresponding to the time period necessary prior to a flight in which a diver must stop diving is stored in ROM 123b. CPU 123a compares this predetermined time previously stored in ROM 123b with the surface interval data from counter B 125. If the surface interval data from counter B 125 is less than the predetermined time period stored in ROM 123b, CPU 123a delivers a flag such as a flashing signal to be displayed at LCD 126. CPU 123 continuously subtracts the surface interval data from counter B 125 from the predetermined time and outputs the result to LCD 126 which displays the time as a elapsed time counter, counting down the time remaining before a safe air flight may be taken.

An external input switch 127 allows the input of the flight time, such as 7:00 a.m. of the upcoming flight to CPU 123a which in turn causes this information to be stored in RAM 123c. CPU 123a subtracts the predetermined surface interval time period previously stored in ROM 123b from the newly input flight departure time. If this subtracted value corresponds to a time later than the present time at which the subtraction is made, CPU 123a causes LCD 126 to display a no dive flag warning.

Figure 11B:
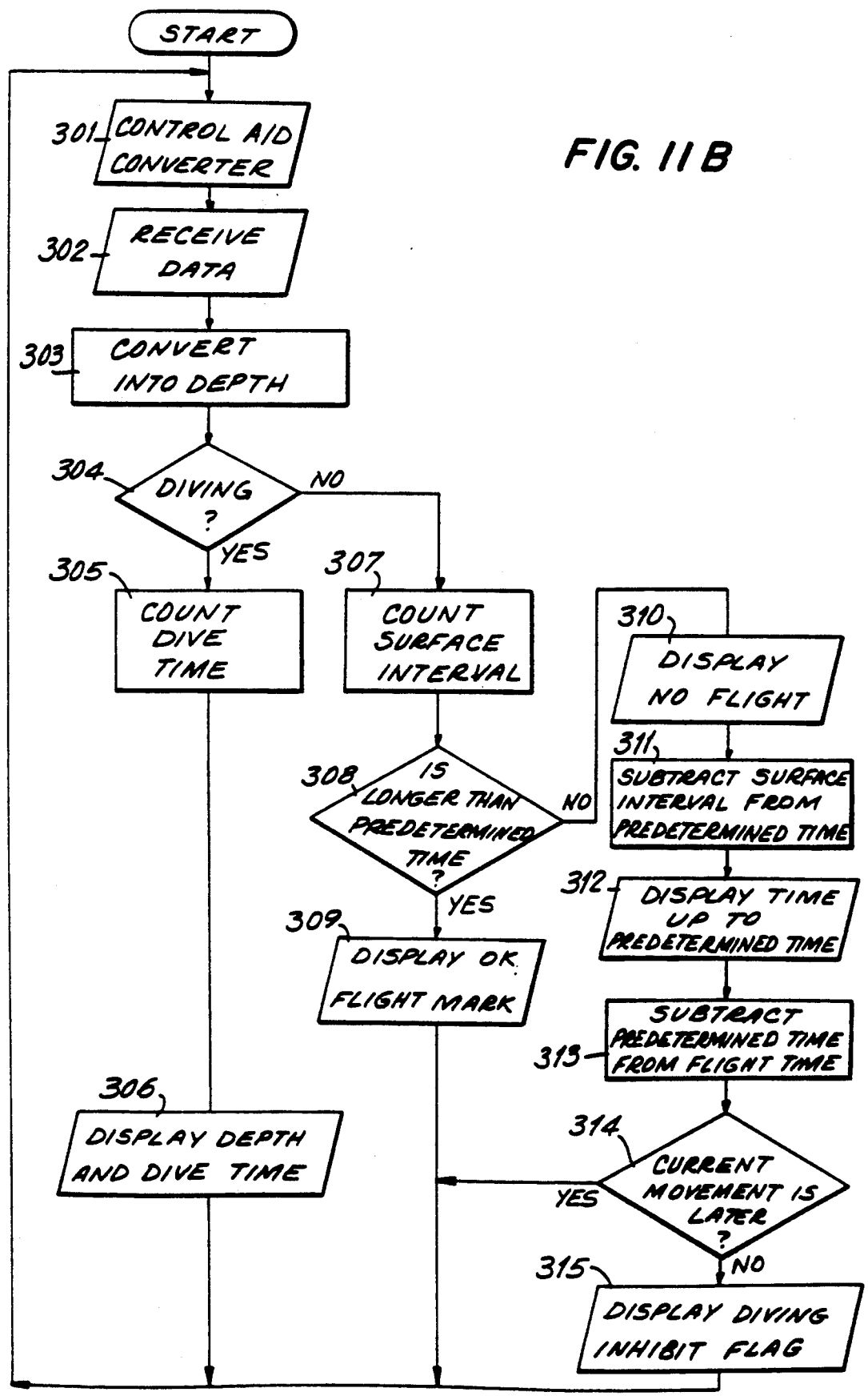
FIG. 11B is a flow chart for the operation of the flight time indicator.

Reference is now made to FIG. 11B in which a flow chart for the flight warning and dive inhibit warning operation of the small-sized electronic device is provided. CPU 123a controls A/D converter 122 to process the signals received from pressure sensor 121 in a step 301. The digital pressure value from A/D converter 122 is input to CPU 123 in a step 302 and is converted into a depth value in a step 304. Based upon the converted depth value it is determined whether the diver is diving in a step 304. If it is determined the diver is diving than the dive interval time is counted by counter A 124 in a step 305 and the dive depth and dive time are displayed on LCD 126 in a step 306.

If it is determined in step 304 that the diver is not diving, the surface interval time period is counted in a step 307 by counter B 125. In a step 308 it is then determined whether the surface interval time counted by counter B 125 equals the predetermined surface interval time necessary prior to taking a flight stored in ROM 123b. If the surface interval time is greater than the predetermined time stored in ROM 123b, an "OK" mark is displayed on LCD 126 in a step 309. Where the surface interval counted by counter B 125 is less than the predetermined time stored in ROM 123b, a "NO" flight message is displayed on LCD 126. The surface interval time is then subtracted from the predetermined time in a step 311 and a time elapsed time of time remaining to the end of the predetermined time period is displayed in a step 312.

The predetermined time interval is then subtracted from the flight departure time in a step 313. It is determined whether the present real time occurs before the predetermined time in a step 314. If the current time falls within the predetermined time a diving inhibit flag is displayed on LCD 126 in a step 315.

Generally, it is the rule that a diver is not allowed to fly on an airplane during a period less than 12 hours after the termination of diving. (see *U.S. Navy Diving Manual*). Without proper calculation, a diver may carelessly take an airplane ride. In accordance with the small-sized electronic device of FIG. 11A the surface interval time is counted and a flight inhibit mark or the elapsed time remaining until flight is displayed making it possible to prevent anyone from taking an airplane ride before the 12 hour safety period has elapsed thereby insuring safe scuba diving.

Further, the electronic device is preset to contain the flight departure time. A diving inhibit flag will be displayed when it is twelve hours or less prior to the flight departure time thus preventing the diver from accidentally flying if he has dived during the 12 hour period because the flight inhibit mark is displayed even after the flight departure time has arrived. Such a situation would occur if a scuba diver were to dive unaware of the flight departure time. Therefore, anyone can enjoy diving due to the effectiveness of the electronic device as described above.

Figure 12:
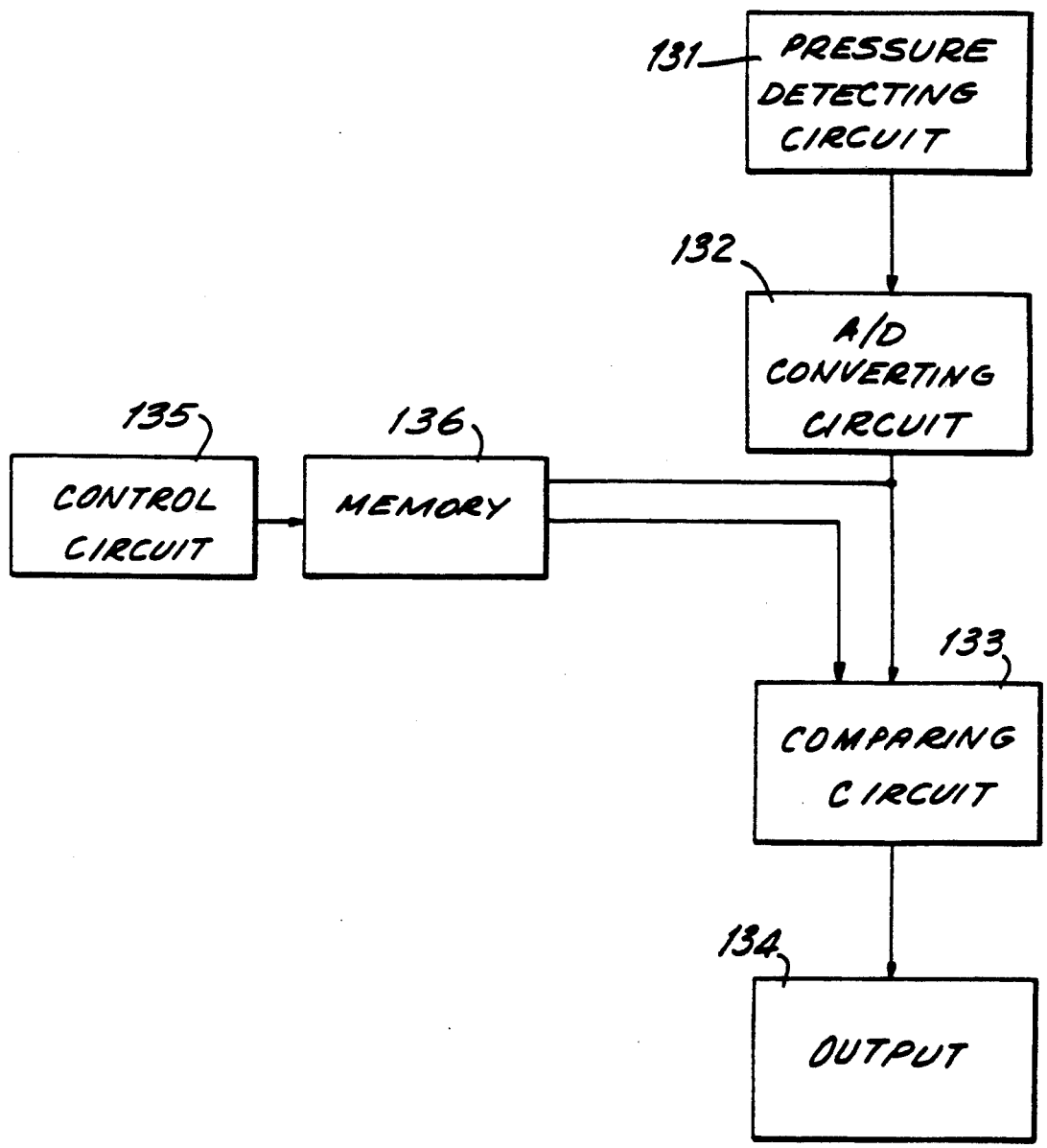
FIG. 12 is a block diagram of a descend/ascend indicator constructed in accordance with the invention

Reference is now made to FIG. 12 in which a block diagram of a small-sized electronic device having a depth gauge for indicating a diving/surfacing indicator is provided. A pressure detecting circuit 131 detects pressure and produces an analog signal corresponding to the pressure detected. A/D converting circuit 132 receives this analog signal and outputs a digital pressure signal. A comparing circuit 133 receives the digital pressure signal. A control circuit 135 sends a control signal to a memory 136 instructing the memory, to receive the digital signal from A/D converting circuit 132. A comparing circuit 133 continuously receives the output from A/D converting circuit 132 and compares it with the previously stored digital pressure value contained in memory 136. By comparing the previously sensed depth value with the currently sensed depth value comparing circuit 133 determines whether the diver is ascending or descending and provides an output to an output 134 to display the indication.

By providing the small-sized electronic device with a memory for maintaining previously sensed pressures and a comparing circuit for comparing the depth value contained within the memory to the current depth value a simplified configuration is provided allowing any diver to perceive at a glance whether he is descending or ascending, a feature not found in the prior art dive watches. The conventional diver's watch with depth gauge still requires the judgement of the diver as to whether he is diving or ascending. The diver must mentally compare the current value of the depth read with a previous read value. By providing a comparing circuit and memory, the diver can know whether he is now descending or ascending merely by glancing at the electronic device freeing the diver to pay greater part of his attention to other matters.

Figure 14:
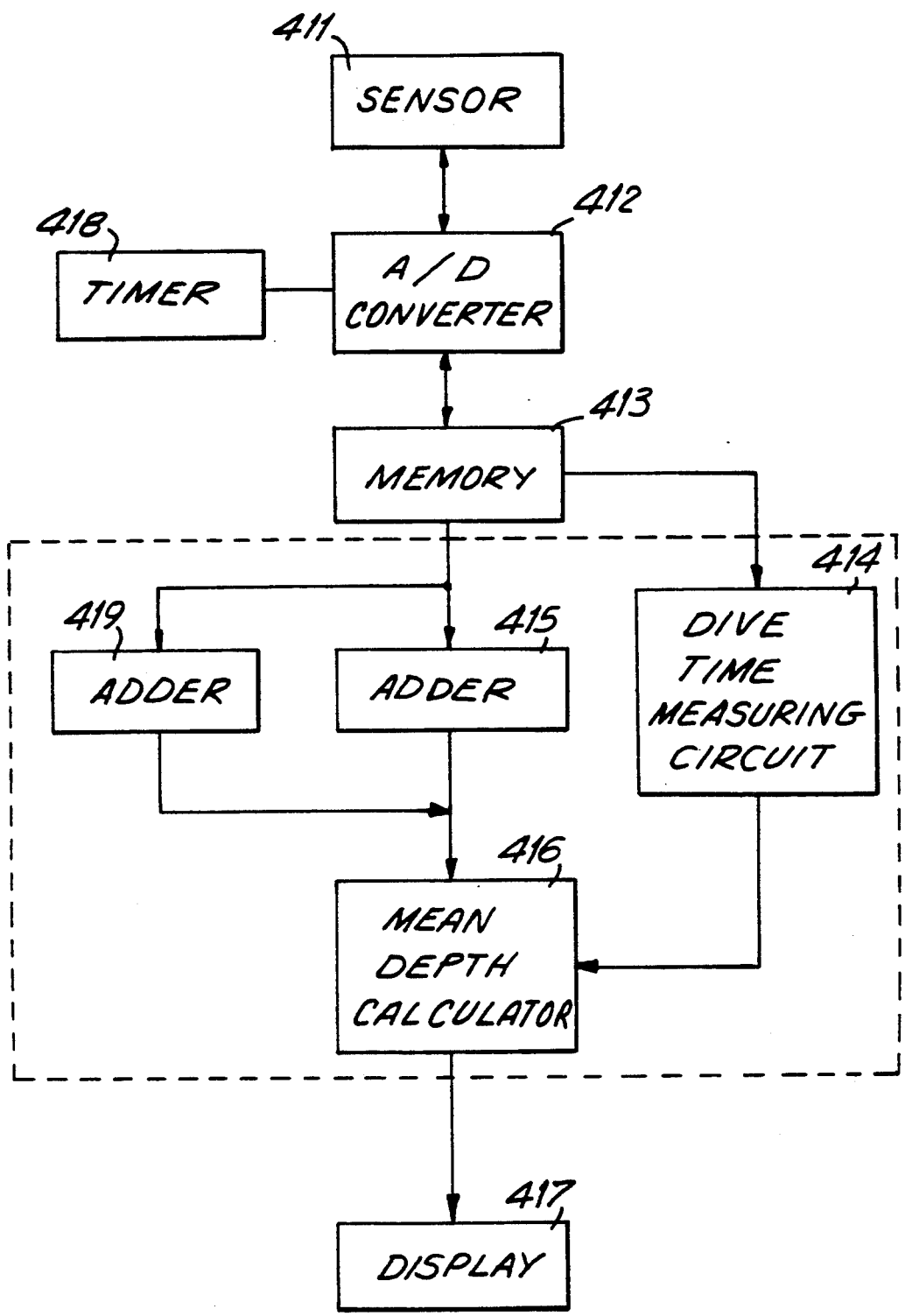
FIG. 14 is a block diagram of an electronic instrument with depth gauge constructed in accordance with another embodiment of the invention.

Reference is now made to FIG. 14 in which an embodiment of the invention for measuring and displaying a mean water depth is provided. The small-sized electronic device of the embodiment of FIG. 14 includes a pressure sensor 411 which measures the current pressure of the environment in which sensor 411 is disposed. Pressure sensor 411 outputs pressure sensor data in an analog form such as an analog voltage waveform. An A/D converter 412 periodically signals and converts the analog data into a digital pressure value under the control of timer 418. The digital pressure data output by A/D converter 412 is stored in a memory 413. A dive time measuring circuit 414 measures the duration of the dive. A first adder 415 receives input from memory 413 and sums the pressure data stored in memory 413. The output of adder 415 is provided to a mean depth calculator 416. Mean depth calculator 416 receives the output of adder 415 and divides the output of adder 415 by the output of dive time measuring circuit 414 to determine a mean depth which is output to a display 417. Mean depth calculator 416, adder 415 and memory 413 form portions of a micro-computer 423.

A mean depth is calculated in a second way by mean depth calculator 416. A timer 418 triggers A/D converter 412 causing sensor 411 to provide sampling outputs rather than continuous outputs. The sampling outputs are processed by A/D converter 412 as discussed above and the sampled outputs are stored in memory 413. A second adder 419 adds the sample timing outputs each time timer 418 provides an ON input to A/D converter 412. Mean depth calculator 416 calculates a mean depth by dividing the total depth data summed in adder 419 by the number of samplings.

A mean depth is also calculated a third way by calculator 416. Calculator 416 multiplies the last obtained mean depth value by the number of water pressure measurements taken (N−1). Mean depth calculator 16 adds the pressure data from the A/D converter 12 to the multiplied result and divides this added result by the current number of water pressure measurements (N).

This results is output by mean depth calculator 416 to display 417 as a mean depth.

By providing a structure which calculates mean depth on a continuing basis in response to pressures sensed by a pressure sensor, an accurate mean water depth is automatically calculated based on the total depth and dive time. The mean depth is then displayed. A ratio of displayed time and water depth to the air consumption is an important criteria for knowing the diver's physical condition. Calculation of the mean depth and total dive time makes it possible to predict tank air consumption during the next repetitive dive. Adjustments can be made in accordance with physical conditions in terms of controlling depressurization. Therefore, a much safer small-sized electronic device with depth gauge is provided.

Figure 15:
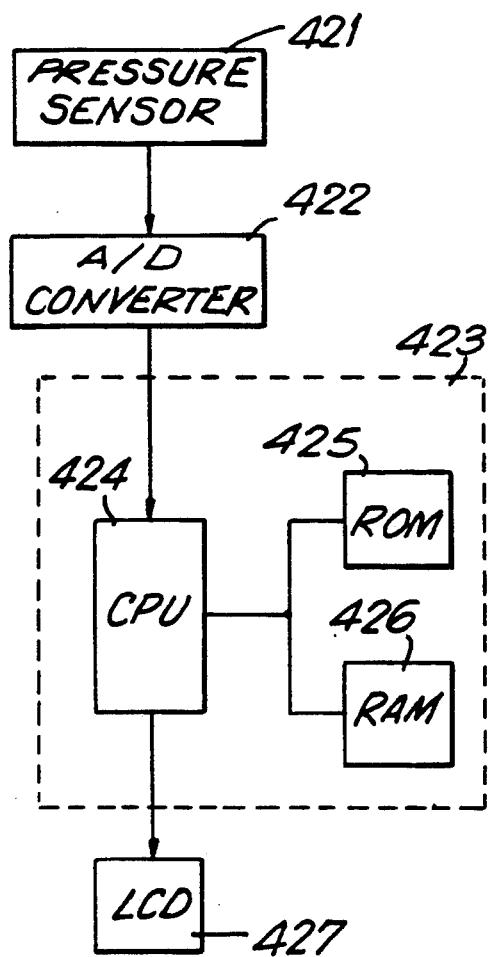
FIG. 15 is a block diagram of a physical construction of the embodiment of the invention of FIG. 14.

Reference is now made to FIG. 15 in which a block diagram for one embodiment of the mean depth time version of the small-sized electronic device is provided. A micro-computer 423 including CPU 424 receives inputs from a ROM 425 which stores software and a RAM 426 which stores data. A/D converter 422 receive a 1Hz signal from CPU 424 triggering A/D converter 422 to begin operation. A/D converter 422 causes a power supply to supply a pressure sensor 421 with electricity. Pressure sensor 421 senses the pressure of the surrounding environment and in response thereto outputs pressure data in the form of an analog voltage value. A/D converter 422 converts the input analog data into digital data. The digital data is stored by CPU 424 in RAM 426. If it is determined that a dive is presently being executed, CPU 424 computes the mean depth and measures a dive time based upon the data input from A/D converter 422 as discussed in connection with the mean depth calculator 416 of FIG. 14. The calculated mean depth results the output to an LCD 427 on which the results are displayed.

Figure 16:
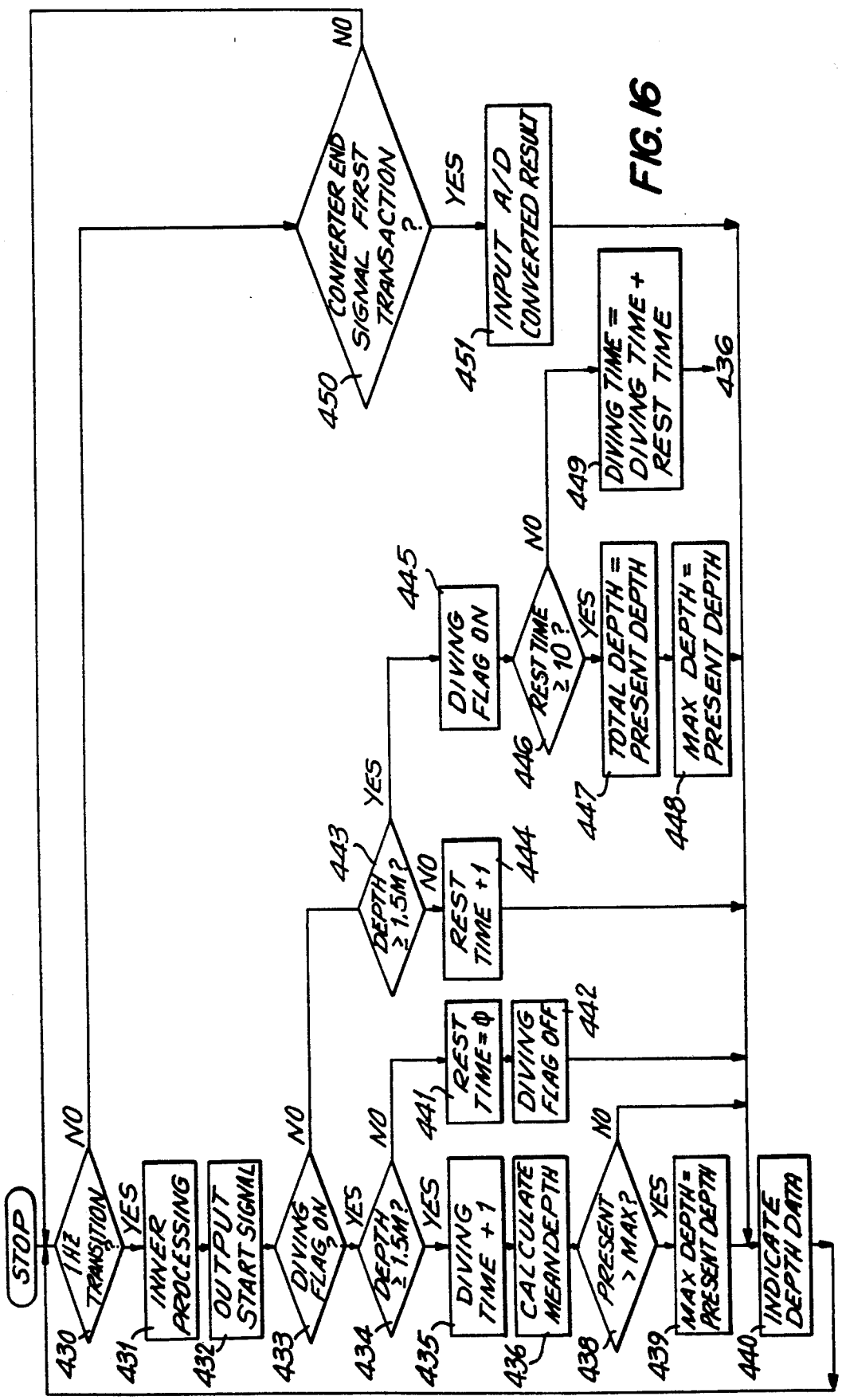
FIG. 16 is a flow-chart showing the operation of the embodiment of the invention of FIG. 14.

Reference is now made to FIG. 16 in which the operation of CPU 424 of the small-sized electronic device with depth gauge is depicted. In a first step 430, it is determined whether the one Hz transition signal is present. If the signal is present, then the timer processing for counting the dive time interval is begun in a step 431 so that the time interval is counted and an alarm check is also carried out. Next, an A/D converter start signal is output to A/D converter in a step 432.

In a step 432 it is determined whether a present dive flag is ON. If the dive flag is ON that indicates that a dive is taking place. It is then determined in a step 434 whether the present dive depth is greater than 1.5 meters. If the depth is greater than 1.5 meters, a second is added to the dive time interval in a step 435 so that current dive time is equal to dive time plus one. Subsequently, a mean water depth is calculated in a step 436. The present depth is compared with a maximum depth in a step 438. If the present depth is greater than the maximum depth than the maximum depth is made equal to the present depth in a step 439. The present depth, dive time, maximum depth, mean water depth and the time are all displayed in a step 440. The operation is then repeated.

When it is determined in step 434 that the diving flag is ON and that the depth of the dive is less than 1.5 meters in a step 434, the diver rest time is reset in a step 441. The diving flag is then turned OFF and the current& values for depth, time, mean depth and the like discussed above are displayed in a step 440. The operation than returns to a stop state.

When it is determined in step 433 that the diving flag is OFF, it is again determined whether the current depth monitored by the device is greater than or equal to 1.5 meters in a step 443. If the depth is less than 1.5 meters, a second is added to the diver rest time in a step 444 so that rest time no equals rest time plus one second. The depth data is then indicated in a step 440 and the operation is again returned to the stop state.

When the diving flag is OFF and it is determined in step 443 that the present depth is greater than 1.5 meters, the diving flag is turned ON in a step 445. It is then determined whether the diver rest time is greater than or equal to ten minutes. If the rest time exceeds ten minutes the total dive depth is made to equal the present dive depth in a step 447. Then, the maximum depth is set to the present depth in a step 448. The depth data is then displayed in accordance with a step 40 and the entire process is returned to the stop state.

When the diving flag is ON, and it is determined that the rest time is not greater than ten minutes, the rest time is added to the present dive time to arrive at a new dive time value in a step 449 so that the rest time is included as diving time. Steps 436 beginning with calculating the mean depth through displaying the depth data in step 440 are then repeated. The entire operation is then returned to the stop state.

If, in step 430 a 1 Hz transition signal is not present, it is determined whether a A/D converter end signal corresponds to the first transition signal of step 430 in a step 450. If there is no converter end signal the operation returns to the stop state. If the end signal is at the first transition, the A/D converted result is output and displayed in a step 451 and 440 prior to returning to the stop state.

Figure 17:
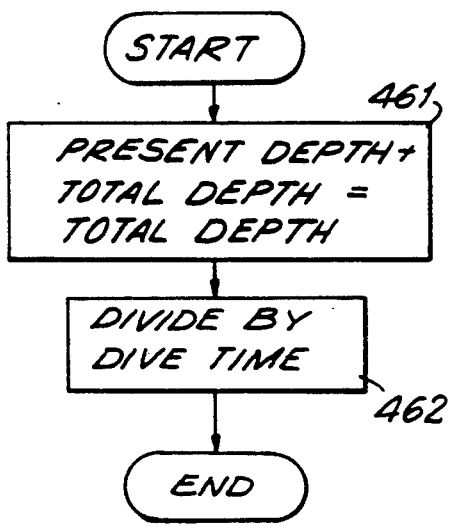
FIG. 17 is a flow-chart showing the operation of the embodiment of FIG. 14 in greater particularity.

Reference is now made to FIG. 17 which illustrates the operation of micro-computer 23 for one mode of calculating mean dive time in accordance with step 436. During diving, a total depth value is obtained by adding the previous total depth value to the present depth in a step 461. The new total depth value is divided by the dive time interval in a step 462 resulting in a mean depth value.

Figure 18:
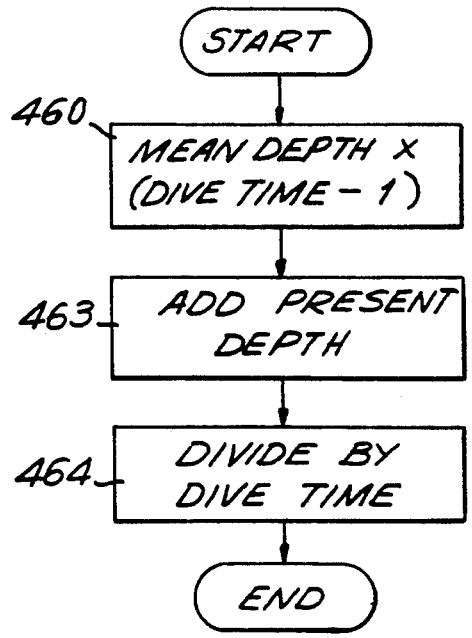
FIG. 18 is a flow-chart showing the operation of an electronic instrument with depth gauge constructed in accordance with another embodiment of the invention.

Reference is now made to FIG. 18 in which a second method for calculating mean depth in accordance with step 436 for operation of micro-computer 23 is provided. The previous mean depth value is multiplied by the previous dive time interval in a step 460. This multiplied value is then added to the present depth value in a step 463. This added value results in a total dive depth which is divided by the current dive time in a step 464. This value is the mean depth.

Figure 19:
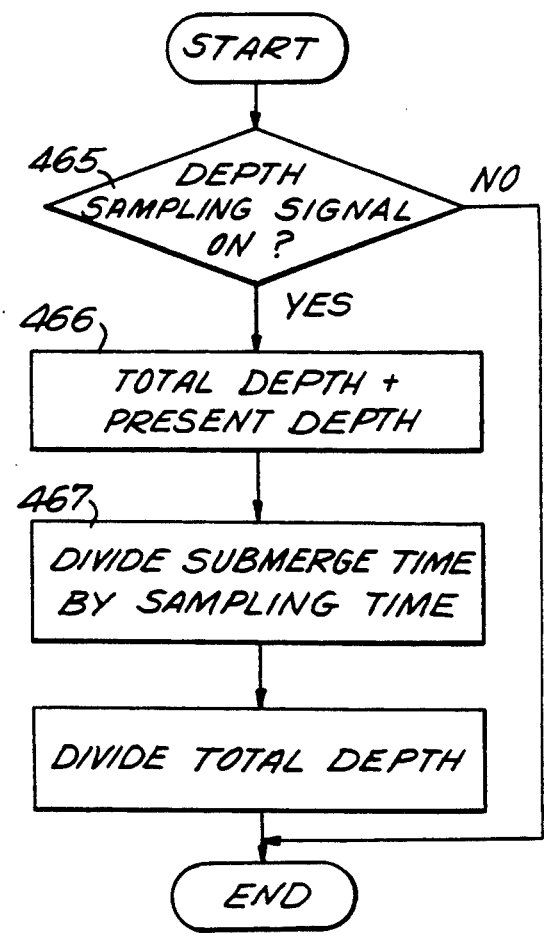
FIG. 19 is a flow-chart showing the operation of an electronic instrument with depth gauge constructed in accordance with still another embodiment of the invention.

Reference is now made to FIG. 19 in which another method for calculating the mean depth in accordance with step 436 is provided. It is first determined whether or not a mean depth sampling signal is ON in a step 465. If the signal is OFF then the process moves to step 438 (FIG. 16). If the sampling signal output by timer 418 is ON, the present depth stored in memory 413 is added to the total depth previously obtained to arrive at a new value for total depth in a step 446. The overall dive time obtained by dive time measuring circuit 414 is divided by the sampling time in a step 467. The total depth is divided by the value obtained in step 467 in a step 468. The resulting value is a mean depth.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention which, as a matter of language might be said to fall therebetween.

What is claimed:

1. A small-sized electronic device with depth gauge comprising:
   pressure sensor means for measuring a current pressure and outputting pressure data in response thereto;
   memory means for storing the pressure data;
   dive time measuring means for measuring a dive time interval;
   mean depth calculating means for receiving said stored pressure data and said dive time interval and calculating a mean depth in response thereto; and
   display means for displaying the mean depth.

2. The small-sized electronic device of claim 1, wherein said pressure data is an analog voltage waveform and further comprising an A/D converter means for gradually converting said analog voltage waveform into a digital pressure value.

3. The small-sized electronic device with depth gauge of claim 1, wherein said mean depth calculating means includes adder means for summing the pressure data stored in said memory means and outputting a total depth data and said mean depth calculating means dividing said total depth data by said dive time interval to produce said mean depth.

4. The small-sized electronic device with depth gauge of claim 1, wherein said mean depth calculating means includes timer means for outputting a mean depth calculating sampling timing signal and adder means for summing the pressure data of said storage means at each occurrence of a timing signal transmitted from said timer means to produce a total depth data, and said mean depth calculating means dividing said total depth data by the number of said samplings and outputs said mean depth.

5. The small-sized electronic device with depth gauge of claim 1, wherein said storage means stores the previous mean depth and previous sensed water pressure and multiplies said previous mean depth by said previous sensed water pressure to obtained a value, adds said pressure data to said value to obtain a second value and divides said second value by the number of water pressure measurements made by said water pressure sensor to produce said mean depth value.

6. The small-sized electronic device with depth gauge of claim 1, wherein said mean depth calculating means is a CPU.

7. The small-sized electronic device with depth gauge of claim 1, wherein said storage means comprises a ROM for storing software operations and a RAM for storing data.

8. The small-sized electronic device with depth gauge of claim 5, wherein said storage means comprises a ROM for storing software operations and RAM for storing data, said previous mean depth value, previous water pressure and said pressure value being stored in said RAM.

9. A small-sized electronic device having a depth gauge comprising:
   depth measuring means for measuring a depth and producing depth data;
   first memory means for storing decompression data;
   first counting means for counting a dive time interval and producing dive time interval data;
   second counting means for counting a surface interval and producing surface interval data;
   first calculating means for receiving said depth data, reading said decompression data stored in said first memory means and calculating a non-decompression time limit;
   decompression management means for determining when the non-decompression time limit has been exceed, calculating a decompression profile and producing decompression dive data;
   second memory means for storing a residual nitrogen time;
   second calculating means for receiving said depth data, surface interval data, said dive time data, reading said decompression data from said first memory means, reading said residual nitrogen time from said memory means and calculating a repetitive dive non-decompression time limit;
   third memory means for storing the depth data;
   mean depth calculating means for receiving said stored depth data and said dive time interval data and calculating a mean depth in response thereto;
   display means for displaying said depth data, decompression data, dive time data, surface interval data, decompression dive data, non-decompression time limit, residual nitrogen time, mean depth; and
   control means for receiving said depth data, dive time data, surface interval data, non-decompression time limit, decompression dive data, residual nitrogen time, mean depth and repetitive dive non-decompression time limit, and causing the display means to display each of said data either simultaneously or independently.

10. The small-sized electronic device of claim 9, wherein said depth data is an analog voltage waveform and further comprising an A/D converter means for converting said analog voltage waveform into a digital depth value.

11. The small-sized electronic device with depth gauge of claim 9, wherein said mean depth calculating means includes adder means for summing the depth data stored in said third memory means and outputting a total depth data and said mean depth calculating means dividing said total depth data by said dive time interval to produce said mean depth.

12. The small-sized electronic device with depth gauge of claim 9, wherein said mean depth calculating means includes timer means for outputting a mean depth calculating sampling timing signal and adder means for summing the pressure data of said storage means at each occurrence of a timing signal transmitted from said timer means to produce a total depth data, and said mean depth calculating means dividing said total depth data by the number of said samplings and outputs said mean depth.

13. The small-sized electronic device with depth gauge of claim 9, wherein said storage means stores the previous mean depth and previous sensed water pressure and multiplies said previous mean depth by said previous sensed water pressure to obtained a value, adds said pressure data to said value to obtain a second value and divides said second value by the number of water pressure measurements made by said water pressure sensor to produce said mean depth value.

14. The small-sized electronic device with depth gauge of claim 9, wherein said mean depth calculating means is a CPU.

15. The small-sized electronic device with depth gauge of claim 9, wherein said storage means comprises a ROM for storing software operations and a RAM for storing data.

16. The small-sized electronic device with depth gauge of claim 15, wherein said storage means comprises a ROM for storing software operations and RAM for storing data, said previous mean depth value, previous water pressure and said pressure value being stored in said RAM.

17. The small-sized electronic device having a depth gauge of claim 9, wherein said depth measuring means is a pressure sensor.

18. The small-sized electronic device having a depth gauge of claim 9, further comprising a CPU, said first counting means, second counting means, first calculating means, decompression management means, second memory means, second calculating means and mean depth calculating means forming said CPU.

* * * * *